(12) United States Patent
Lopez et al.

(10) Patent No.: US 12,054,499 B2
(45) Date of Patent: Aug. 6, 2024

(54) TRANSITION METAL COMPLEXES AS VISIBLE LIGHT ABSORBERS

(71) Applicant: Johnson & Johnson Vision Care, Inc., Jacksonville, FL (US)

(72) Inventors: Michael J. Lopez, Jacksonville, FL (US); Shivkumar Mahadevan, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 17/662,910

(22) Filed: May 11, 2022

(65) Prior Publication Data

US 2023/0037781 A1   Feb. 9, 2023

Related U.S. Application Data

(60) Provisional application No. 63/216,589, filed on Jun. 30, 2021.

(51) Int. Cl.
  *C07F 15/02* (2006.01)
  *G02B 1/04* (2006.01)

(52) U.S. Cl.
  CPC ............ *C07F 15/025* (2013.01); *G02B 1/041* (2013.01)

(58) Field of Classification Search
  USPC ....................................................... 428/411.1
  See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 3,808,178 A | 4/1974 | Gaylord | |
| 4,113,224 A | 9/1978 | Clark et al. | |
| 4,120,570 A | 10/1978 | Gaylord | |
| 4,136,250 A | 1/1979 | Mueller et al. | |
| 4,153,641 A | 5/1979 | Deichert et al. | |
| 4,197,266 A | 4/1980 | Clark et al. | |
| 4,436,887 A | 3/1984 | Chromecek et al. | |
| 4,495,313 A | 1/1985 | Larsen | |
| 4,659,782 A | 4/1987 | Spinelli | |
| 4,659,783 A | 4/1987 | Spinelli | |
| 4,740,533 A | 4/1988 | Su et al. | |
| 4,889,664 A | 12/1989 | Kindt-Larsen et al. | |
| 4,910,277 A | 3/1990 | Bambury et al. | |
| 5,006,622 A | 4/1991 | Kunzler et al. | |
| 5,034,461 A | 7/1991 | Lai et al. | |
| 5,039,459 A | 8/1991 | Kindt-Larsen et al. | |
| 5,070,215 A | 12/1991 | Bambury et al. | |
| 5,236,969 A | 8/1993 | Kunzler et al. | |
| 5,244,981 A | 9/1993 | Seidner et al. | |
| 5,270,418 A | 12/1993 | Kunzler et al. | |
| 5,298,533 A | 3/1994 | Nandu et al. | |
| 5,314,960 A | 5/1994 | Spinelli et al. | |
| 5,331,067 A | 7/1994 | Seidner et al. | |
| 5,371,147 A | 12/1994 | Spinelli et al. | |
| 5,760,100 A | 6/1998 | Nicolson et al. | |
| 5,776,999 A | 7/1998 | Nicolson et al. | |
| 5,789,461 A | 8/1998 | Nicolson et al. | |
| 5,824,719 A | 10/1998 | Kunzler et al. | |
| 5,849,811 A | 12/1998 | Nicolson et al. | |
| 5,962,548 A | 10/1999 | Vanderlaan et al. | |
| 5,965,631 A | 10/1999 | Nicolson et al. | |
| 5,998,498 A | 12/1999 | Vanderlaan et al. | |
| 6,020,445 A | 2/2000 | Vanderlaan et al. | |
| 6,087,415 A | 7/2000 | Vanderlaan et al. | |
| 6,367,929 B1 | 4/2002 | Maiden et al. | |
| 6,420,453 B1 | 7/2002 | Bowers et al. | |
| 6,423,761 B1 | 7/2002 | Bowers et al. | |
| 6,767,979 B1 | 7/2004 | Muir et al. | |
| 6,822,016 B2 | 11/2004 | McCabe et al. | |
| 6,867,245 B2 | 3/2005 | Iwata et al. | |
| 6,943,203 B2 | 9/2005 | Vanderlaan et al. | |
| 6,951,894 B1 | 10/2005 | Nicolson et al. | |
| 7,052,131 B2 | 5/2006 | McCabe et al. | |
| 7,247,692 B2 | 7/2007 | Laredo | |
| 7,249,848 B2 | 7/2007 | Laredo et al. | |
| 7,396,890 B2 | 7/2008 | Zanini et al. | |
| 7,461,937 B2 | 12/2008 | Steffen et al. | |
| 7,468,398 B2 | 12/2008 | Nicolson et al. | |
| 7,506,977 B1 | 3/2009 | Aiiso | |
| 7,538,146 B2 | 5/2009 | Nicolson et al. | |
| 7,553,880 B2 | 6/2009 | Nicolson et al. | |
| 7,572,841 B2 | 8/2009 | Chen et al. | |

(Continued)

FOREIGN PATENT DOCUMENTS

EP    0080539 B1    6/1983
EP    2875091 A1    5/2015

(Continued)

OTHER PUBLICATIONS

Compendium of Polymer Terminology and Nomenclature: IUPAC Recommendations 2008, edited by: Richard G. Jones, Jaroslav Kahovec, Robert Stepto, Edward S. Wilks, Michael Hess, Tatsuki Kitayama, and W. Val Metanomski.
Crivello, et al, Photoinitiators for Free Radical Cationic & Anionic Photopolymerisation, 2nd Edition, vol. III, pp. 275-298, John Wiley and Sons, New York, 1998.
Doutch et al, Ultraviolet Light Transmission through the Human Corneal Stroma Is Reduced in the Periphery, Biophysical Journal, vol. 102, Mar. 2012, pp. 1258-1264.
Ham et al., "Retinal sensitivity to damage from short wavelength light." Nature, vol. 260 (1976), pp. 153-155.
Hammond, The Visual Effects of Intraocular Colored Filters, Scientifica, 2012, pp. 1-18, vol. 2012, Article ID 424965.
Statement on Ocular Ultraviolet Radiation Hazards in Sunlight, American Optometric Association, Nov. 10, 1993.

(Continued)

*Primary Examiner* — Terressa Boykin
(74) *Attorney, Agent, or Firm* — Raef M. Shaltout

(57) ABSTRACT

Described are visible light absorbing compounds. The compounds absorb various visible light wavelengths, such as in the region of 500 to 625 nm, and are suitable for incorporation in various products, such as biomedical devices and ophthalmic devices.

5 Claims, 2 Drawing Sheets

(56) References Cited

U.S. PATENT DOCUMENTS

| | | | |
|---|---|---|---|
| 7,666,921 | B2 | 2/2010 | McCabe et al. |
| 7,691,916 | B2 | 4/2010 | McCabe et al. |
| 7,786,185 | B2 | 8/2010 | Rathore et al. |
| 7,825,170 | B2 | 11/2010 | Steffen et al. |
| 7,915,323 | B2 | 3/2011 | Awasthi et al. |
| 7,934,830 | B2 | 5/2011 | Blackwell et al. |
| 7,956,131 | B2 | 6/2011 | Arnold et al. |
| 7,994,356 | B2 | 8/2011 | Awasthi et al. |
| 8,022,158 | B2 | 9/2011 | Rathore et al. |
| 8,138,290 | B2 | 3/2012 | Blackwell et al. |
| 8,163,206 | B2 | 4/2012 | Chang et al. |
| 8,273,802 | B2 | 9/2012 | Laredo et al. |
| 8,389,597 | B2 | 3/2013 | Blackwell et al. |
| 8,399,538 | B2 | 3/2013 | Steffen et al. |
| 8,415,404 | B2 | 4/2013 | Nicolson et al. |
| 8,420,711 | B2 | 4/2013 | Awasthi et al. |
| 8,450,387 | B2 | 5/2013 | McCabe et al. |
| 8,470,906 | B2 | 6/2013 | Rathore et al. |
| 8,480,227 | B2 | 7/2013 | Qiu et al. |
| 8,487,058 | B2 | 7/2013 | Liu et al. |
| 8,507,577 | B2 | 8/2013 | Zanini et al. |
| 8,568,626 | B2 | 10/2013 | Nicolson et al. |
| 8,637,621 | B2 | 1/2014 | Iwata et al. |
| 8,703,891 | B2 | 4/2014 | Broad |
| 8,937,110 | B2 | 1/2015 | Alli et al. |
| 8,937,111 | B2 | 1/2015 | Alli et al. |
| 8,940,812 | B2 | 1/2015 | Reboul et al. |
| 8,980,972 | B2 | 3/2015 | Driver |
| 9,056,878 | B2 | 6/2015 | Fujisawa et al. |
| 9,057,821 | B2 | 6/2015 | Broad et al. |
| 9,125,808 | B2 | 9/2015 | Alli et al. |
| 9,140,825 | B2 | 9/2015 | Alli et al. |
| 9,156,934 | B2 | 10/2015 | Alli et al. |
| 9,170,349 | B2 | 10/2015 | Mahadevan et al. |
| 9,217,813 | B2 | 12/2015 | Liu et al. |
| 9,244,196 | B2 | 1/2016 | Scales et al. |
| 9,244,197 | B2 | 1/2016 | Alli et al. |
| 9,260,544 | B2 | 2/2016 | Rathore et al. |
| 9,297,928 | B2 | 3/2016 | Molock et al. |
| 9,297,929 | B2 | 3/2016 | Scales et al. |
| 9,910,297 | B1 | 3/2018 | Mccabe et al. |
| 2010/0048847 | A1 | 2/2010 | Broad |

FOREIGN PATENT DOCUMENTS

| | | | | |
|---|---|---|---|---|
| WO | 2003022321 | A2 | 3/2003 | |
| WO | 2008061992 | A2 | 5/2008 | |
| WO | WO-2015075714 | A1 * | 5/2015 | ............ B82Y 10/00 |
| WO | 2016100457 | A1 | 6/2016 | |
| WO | 2021200005 | A1 | 10/2021 | |

OTHER PUBLICATIONS

Abherve, et al., "A spin-crossover complex based on a 2,6-bis(pyrazol-1-yl)pyridine (1-bpp) ligand functionalized with a carboxylate group", Dalton transactions, 2014, pp. 9406-9409, vol. 43, Issue 25.

Bartual-Murgui, et al., "Allosteric spin crossover induced by ligand-based molecular alloying", Inorganic chemistry, 2020, pp. 12132-12142, vol. 59 Issue 17.

Berdiell, et al., "Iron and silver complexes of 4-(Imidazol-1-yl)-2,6-di(pyrazol-1-yl)-pyridine (L), including a [[Fe3(μ-F)2F6L8]+ Assembly", Eur. J. Inorg. chem, 2020, pp. 4334-4340, vol. 2020 Issue 46.

Malcolm A Halcrow., The synthesis and coordination chemistry of 2,6-bis(pyrazolyl)pyridines and related ligands—versatile terpyridine analogues, Coordination chemistry reviews, 2005, pp. 2880-2908, vol. 249 Issue 24.

PCT International Search Report, dated Sep. 27, 2022, for PCT Int'l Appln. No. PCT/IB2022/055852.

Piguet, et al., "Molecular magnetism and iron(II) spin-state Equilibrium as structural probes in heterodinuclear d-f complexes", Helvetica chimica acta, 1995, pp. 1651-1672, vol. 78, Issue 7.

Romero, et al., "Monitoring the iron(II)-induced self-assembly of preorganized tritopic ligands by electrospray mass spectrometry: unique formation of metallomacrocycles", Chemical Communications, 1996, pp. 551-553, Issue 4.

Rowan Stuart J et al, Metal/2,6-Bis(Benzimidazolyl)Pyridine Binding: Toward Metallo-supramolecular Polymers, Polymer Preprints (American Chemical Society, Division of Polymer Chemistry), Jan. 1, 2004, pp. 494-495, vol. 45, No. 1, US.

Yao, et al., "Stepwise, multicomponent assembly of a molecular trapezoid possessing three different metals", Chemical Communications, 2017, pp. 8038-8041, vol. 53 Issue 57.

Int'l. Preliminary Report on Patentability for PCT/IB2022/055852, dated Dec. 14, 2023.

* cited by examiner

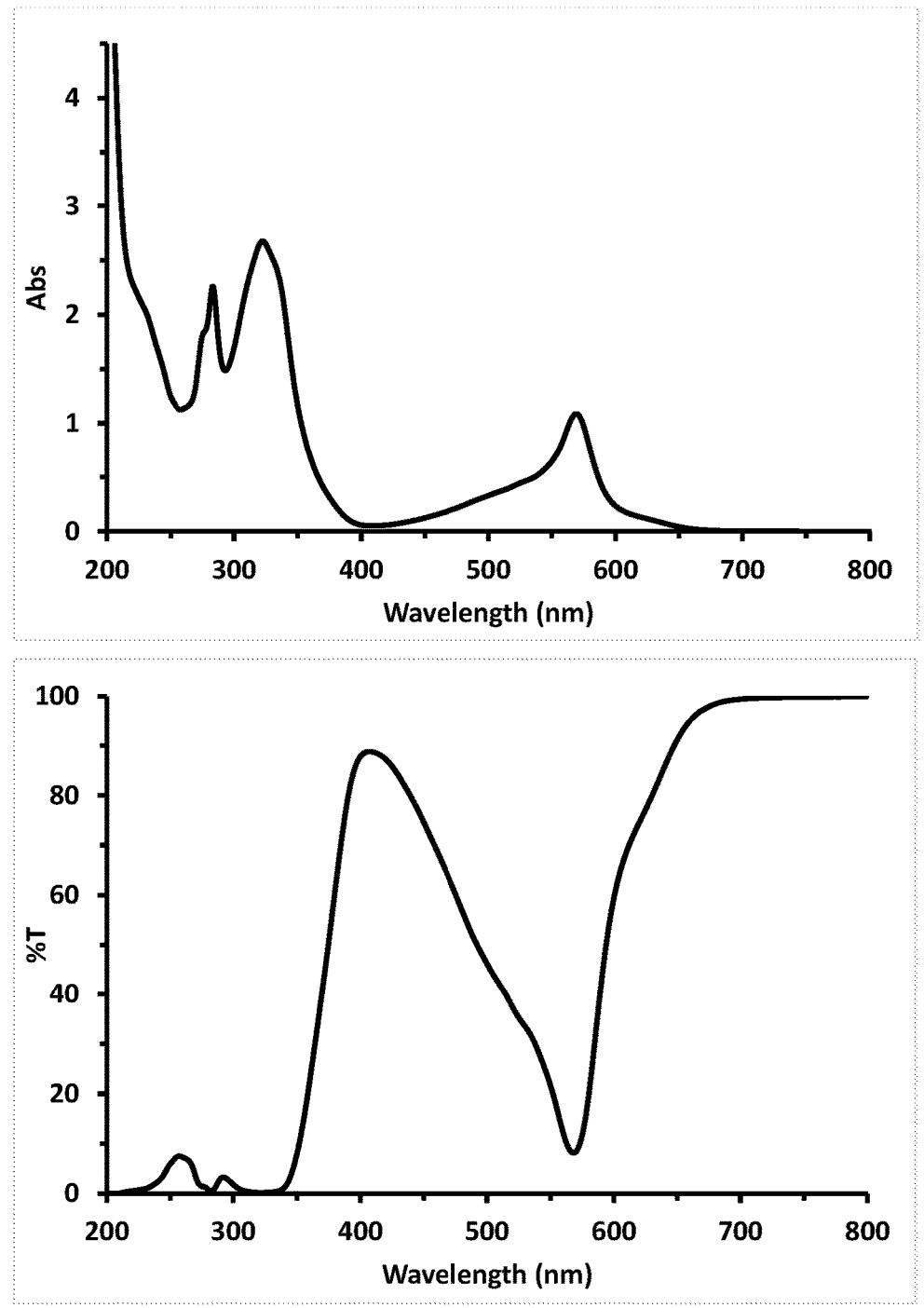
FIG. 1 UV-VIS Spectrum (top) and % Transmission (bottom) of Compound (C) 0.05 mM in acetonitrile

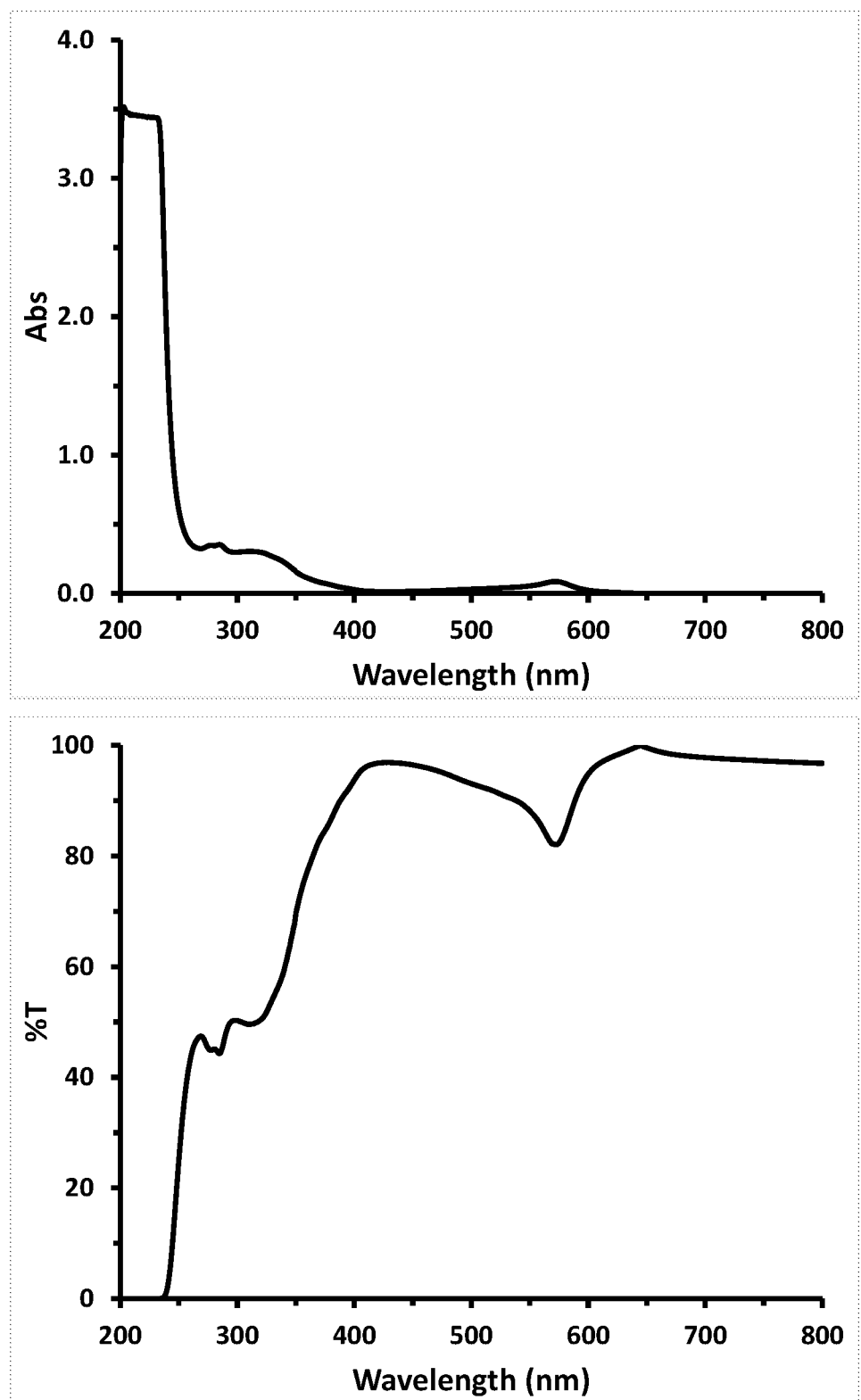
FIG. 2 UV-VIS Spectrum (top) and % Transmission (bottom) of Example 2 Contact Lens

TRANSITION METAL COMPLEXES AS VISIBLE LIGHT ABSORBERS

RELATED APPLICATIONS

This application claims priority to U.S. Provisional Patent Application Ser. No. 63/216,589, filed Jun. 30, 2021, which is incorporated herein by reference in its entirety.

FIELD OF THE INVENTION

The invention relates to visible light absorbers. More particularly, the invention relates to compounds that absorb light having wavelengths within the range of about 500 to about 625 nm. The compounds may be used in a variety of articles, including ophthalmic devices.

BACKGROUND OF THE INVENTION

High energy light from the sun, such as UV light and high-energy visible light, is known to be responsible for cellular damage. While most of the radiation below 280 nm in wavelength is absorbed by the earth's atmosphere, photons possessing wavelengths ranging between 280 and 400 nm have been associated with several ocular disorders including corneal degenerative changes, and age-related cataract and macular degeneration. (See Statement on Ocular Ultraviolet Radiation Hazards in Sunlight, American Optometric Association, Nov. 10, 1993). The human cornea absorbs some radiation up to 320 nm in wavelength (30% transmission) (Doutch, J. J., Quantock, A. J., Joyce, N. C., Meek, K. M., *Biophys. J*, 2012, 102, 1258-1264), but is inefficient in protecting the back of the eye from radiation ranging from 320 to 400 nm in wavelength.

Contact lens standards define the upper UV radiation wavelength at 380 nm. The current Class I UV absorbing criteria defined by the American Optometric Association require >99% of the radiation between 280 and 315 nm (UV B) and >90% of the 316 to 380 nm (UV A) radiation to be absorbed by the contact lens. While the criteria effectively address protection of the cornea (<1% UV B transmittance), there is little attention paid to the lower energy UV radiation (>380<400 nm) associated with retinal damage (Ham, W. T, Mueller, H. A., Sliney, D. H. *Nature* 1976; 260(5547):153-5) or to high energy visible radiation.

High energy-visible (HEV) radiation may cause visual discomfort or circadian rhythm disruption. For example, computer and electronic device screens, flat screen televisions, energy efficient lights, and LED lights are known to generate HEV light. Prolonged exposure to such sources of HEV light may cause eye strain. Viewing HEV light emitting devices at night is also postulated to disrupt the natural circadian rhythm leading, for example, to inadequate sleep.

Absorption of high energy light radiation before it reaches the eye continues to be a desirable goal in the ophthalmics field. However, the extent to which a particular wavelength range is absorbed is also important. For instance, in the UV A and UV B ranges, it may be desirable to absorb as much radiation as possible. On the other hand, since HEV light forms a part of the visible spectrum, complete absorption of HEV light may negatively affect vision. With HEV light, therefore, partial absorption may be more desirable.

Beyond HEV light, absorption of other parts of the visible spectrum can provide further vision benefits (see Hammond, B. R., *Scientifica*, 2012, 12, pp. 1-18). In fact, because the human eye is most sensitive to green light having a wavelength of 555 nanometers under photopic or daylight conditions, the band of green-yellow light centered around 555 nanometers produces an image of highest brightness as compared to other light colors. As a result, blocking green-yellow light between about 550 nanometers and about 600 nanometers can enhance contrast, improve image detail, reduce glare and dazzle, thereby promoting visual comfort. For instance, in U.S. Pat. No. 7,506,977, Y. Aiiso describes a spectacles lens containing an organic dye absorbing between 565 nanometers and 605 nanometers. In U.S. Pat. No. 9,910,297, B. S. McCabe and others describe an ophthalmic lens configured to attenuate visible light in two spectral bands, one of those bands being green-yellow light between 550 nanometers and 590 nanometers.

There is a need for materials that provide targeted absorption of light wavelengths. Compounds that absorb or attenuate certain wavelengths, when used in ophthalmic devices, can help protect the cornea, as well as the interior cells in the ocular environment, from degradation, strain, and/or circadian rhythm disruption, and/or provide visual benefits, such as enhanced contrast, reduced glare, and treatment for color vision deficiency.

SUMMARY OF THE INVENTION

The invention relates to compounds that absorb within the visible light portion of the electromagnetic spectrum, for example in the region of 500 to 625 nm. The compounds described herein may, for instance, be used in ophthalmic devices to, for example, improve the quality of vision of wearers.

Accordingly, in one aspect the invention provides a compound comprising a visible light absorbing chromophore. The visible light absorbing chromophore comprises a substructure of formula I:

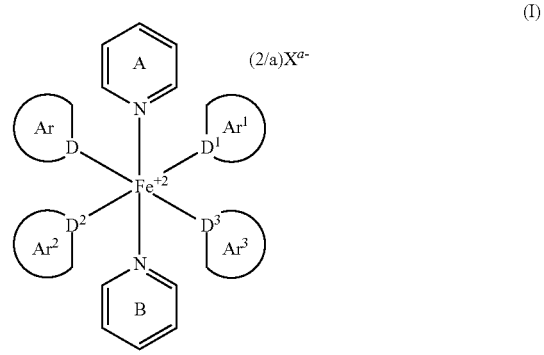

(I)

wherein a is 1 or 2 and X is a monovalent or divalent anion; D, $D^1$, $D^2$, and $D^3$ are independently N, O, or S; and Ar, $Ar^1$, $Ar^2$, and AP, respectively together with D, $D^1$, $D^2$, and $D^3$, are independently heteroaryl, wherein Ar and $Ar^1$ are independently optionally directly bonded to pyridinyl ring A, $Ar^2$ and $Ar^1$ are independently optionally directly bonded to pyridinyl ring B, Ar and $Ar^2$ are optionally directly bonded to each other, and $Ar^1$ and $Ar^3$ are optionally directly bonded to each other.

In a further aspect, the invention provides an ophthalmic device comprising a compound as described herein.

BRIEF DESCRIPTION OF FIGURES

FIG. 1 shows the UV-VIS spectrum of an exemplary compound of the invention (Compound (C) from Example 1, 0.05 mM in acetonitrile).

FIG. 2 shows the UV-VIS spectrum of Example 2 Contact Lens.

DETAILED DESCRIPTION OF THE INVENTION

It is to be understood that the invention is not limited to the details of construction or process steps set forth in the following description. The invention is capable of other embodiments and of being practiced or being carried out in various ways using the teaching herein.

With respect to the terms used in this disclosure, the following definitions are provided.

Unless defined otherwise, all technical and scientific terms used herein have the same meaning as commonly understood by one of ordinary skill in the art to which the invention belongs. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski. All publications, patent applications, patents, and other references mentioned herein are incorporated by reference.

As used herein, the term "(meth)" designates optional methyl substitution. Thus, a term such as "(meth)acrylates" denotes both methacrylates and acrylates.

Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

When a subscript, such as "n" in the generic formula [***]$_n$, is used to depict the number of repeating units in a polymer's chemical formula, the formula should be interpreted to represent the number average molecular weight of the macromolecule.

The term "individual" includes humans and vertebrates.

The term "biomedical device" refers to any article that is designed to be used while either in or on mammalian tissues or fluids, and preferably in or on human tissue or fluids. Examples of these devices include but are not limited to wound dressings, sealants, tissue fillers, drug delivery systems, coatings, adhesion prevention barriers, catheters, implants, stents, and ophthalmic devices such as intraocular lenses and contact lenses. The biomedical devices may be ophthalmic devices, particularly contact lenses, most particularly contact lenses made from silicone hydrogels or conventional hydrogels.

The term "ocular surface" includes the surface and glandular epithelia of the cornea, conjunctiva, lacrimal gland, accessory lacrimal glands, nasolacrimal duct and meibomian gland, and their apical and basal matrices, puncta and adjacent or related structures, including eyelids linked as a functional system by both continuity of epithelia, by innervation, and the endocrine and immune systems.

The term "ophthalmic device" refers to any optical device relating to the eye and includes devices which resides in or on the eye or any part of the eye, including the ocular surface. These devices can provide optical correction, cosmetic enhancement, vision enhancement, therapeutic benefit (for example as bandages) or delivery of active components such as pharmaceutical and nutraceutical components, or a combination of any of the foregoing. Examples of ophthalmic devices include but are not limited to lenses, optical and ocular inserts, including but not limited to punctal plugs, and the like. "Lenses" include spectacle lenses, sunglass lenses, soft contact lenses, hard contact lenses, hybrid contact lenses, intraocular lenses, and overlay lenses. The ophthalmic device may comprise a contact lens.

The term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light absorbing, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

Spectacle lenses or sunglasses may be comprised of mineral material, for example based on silicate, or made from an organic material, such as polycarbonate; polyamide; polyimide; polysulfones; polyethylene terephthalate/polycarbonate copolymers; and various other materials known in the art.

The biomedical devices, ophthalmic devices, and lenses of the present invention may be comprised of silicone hydrogels or conventional hydrogels. Silicone hydrogels typically contain at least one hydrophilic monomer and at least one silicone-containing component that are covalently bound to one another in the cured device.

"Target macromolecule" means the macromolecule being synthesized from the reactive monomer mixture comprising monomers, macromers, prepolymers, cross-linkers, initiators, additives, diluents, and the like.

The term "polymerizable compound" means a compound containing one or more polymerizable groups. The term encompasses, for instance, monomers, macromers, oligomers, prepolymers, cross-linkers, and the like.

"Polymerizable groups" are groups that can undergo chain growth polymerization, such as free radical and/or cationic polymerization, preferably free radical polymerization, for example a carbon-carbon double bond which can polymerize when subjected to radical polymerization initiation conditions. Non-limiting examples of polymerizable groups include (meth)acrylates, styryls, (meth)acrylamides, and vinyl groups. Preferably, the polymerizable group is selected from (meth)acrylate, (meth)acrylamide, N-vinyl lactam, N-vinylamide, vinyl carbonate, vinyl ether, vinyl carbamate, and styryl functional groups. More preferably, the polymerizable group is selected from (meth)acrylates and (meth)acrylamides. The polymerizable group may be unsubstituted or substituted. For instance, the nitrogen atom in (meth)acrylamide may be bonded to a hydrogen, or the hydrogen may be replaced with alkyl or cycloalkyl (which themselves may be further substituted).

Any type of free radical polymerization may be used including but not limited to bulk, solution, suspension, and emulsion as well as any of the controlled radical polymerization methods such as stable free radical polymerization, nitroxide-mediated living polymerization, atom transfer radical polymerization, reversible addition fragmentation chain transfer polymerization, organotellurium mediated living radical polymerization, and the like.

A "monomer" is a mono-functional molecule which can undergo chain growth polymerization, and in particular, free radical polymerization, thereby creating a repeating unit in the chemical structure of the target macromolecule. Some monomers have di-functional impurities that can act as cross-linking agents. A "hydrophilic monomer" is also a monomer which yields a clear single phase solution when mixed with deionized water at 25° C. at a concentration of 5 weight percent. A "hydrophilic component" is a monomer, macromer, prepolymer, initiator, cross-linker, additive, or polymer which yields a clear single phase solution when mixed with deionized water at 25° C. at a concentration of 5 weight percent. A "hydrophobic component" is a monomer, macromer, prepolymer, initiator, cross-linker, additive, or polymer which is slightly soluble or insoluble in deionized water at 25° C.

A "macromolecule" is an organic compound having a number average molecular weight of greater than 1500, and may be reactive or non-reactive.

A "macromonomer" or "macromer" is a macromolecule that has one group that can undergo chain growth polymerization, and in particular, free radical polymerization, thereby creating a repeating unit in the chemical structure of the target macromolecule. Typically, the chemical structure of the macromer is different than the chemical structure of the target macromolecule, that is, the repeating unit of the macromer's pendent group is different than the repeating unit of the target macromolecule or its mainchain. The difference between a monomer and a macromer is merely one of chemical structure, molecular weight, and molecular weight distribution of the pendent group. As a result, and as used herein, the patent literature occasionally defines monomers as polymerizable compounds having relatively low molecular weights of about 1,500 Daltons or less, which inherently includes some macromers. In particular, monomethacryloxypropyl terminated mono-n-butyl terminated polydimethylsiloxane (molecular weight=500-1500 g/mol) (mPDMS) and mono-(2-hydroxy-3-methacryloxypropyl)-propyl ether terminated mono-n-butyl terminated polydimethylsiloxane (molecular weight=500-1500 g/mol) (OH-mPDMS) may be referred to as monomers or macromers. Furthermore, the patent literature occasionally defines macromers as having one or more polymerizable groups, essentially broadening the common definition of macromer to include prepolymers. As a result and as used herein, di-functional and multi-functional macromers, prepolymers, and crosslinkers may be used interchangeably.

A "silicone-containing component" is a monomer, macromer, prepolymer, cross-linker, initiator, additive, or polymer in the reactive mixture with at least one silicon-oxygen bond, typically in the form of siloxy groups, siloxane groups, carbosiloxane groups, and mixtures thereof.

Examples of silicone-containing components which are useful in this invention may be found in U.S. Pat. Nos. 3,808,178, 4,120,570, 4,136,250, 4,153,641, 4,740,533, 5,034,461, 5,070,215, 5,244,981, 5,314,960, 5,331,067, 5,371,147, 5,760,100, 5,849,811, 5,962,548, 5,965,631, 5,998,498, 6,367,929, 6,822,016, 6,943,203, 6,951,894, 7,052,131, 7,247,692, 7,396,890, 7,461,937, 7,468,398, 7,538,146, 7,553,880, 7,572,841, 7,666,921, 7,691,916, 7,786,185, 7,825,170, 7,915,323, 7,994,356, 8,022,158, 8,163,206, 8,273,802, 8,399,538, 8,415,404, 8,420,711, 8,450,387, 8,487,058, 8,568,626, 8,937,110, 8,937,111, 8,940,812, 8,980,972, 9,056,878, 9,125,808, 9,140,825, 9,156,934, 9,170,349, 9,217,813, 9,244,196, 9,244,197, 9,260,544, 9,297,928, 9,297,929, and European Patent No. 080539. These patents are hereby incorporated by reference in their entireties.

A "polymer" is a target macromolecule composed of the repeating units of the monomers used during polymerization.

A "homopolymer" is a polymer made from one monomer; a "copolymer" is a polymer made from two or more monomers; a "terpolymer" is a polymer made from three monomers. A "block copolymer" is composed of compositionally different blocks or segments. Diblock copolymers have two blocks. Triblock copolymers have three blocks. "Comb or graft copolymers" are made from at least one macromer.

A "repeating unit" is the smallest group of atoms in a polymer that corresponds to the polymerization of a specific monomer or macromer.

An "initiator" is a molecule that can decompose into radicals which can subsequently react with a monomer to initiate a free radical polymerization reaction. A thermal initiator decomposes at a certain rate depending on the temperature; typical examples are azo compounds such as 1,1'-azobisisobutyronitrile and 4,4'-azobis(4-cyanovaleric acid), peroxides such as benzoyl peroxide, tert-butyl peroxide, tert-butyl hydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

A "cross-linking agent" is a di-functional or multi-functional monomer or macromer which can undergo free radical polymerization at two or more locations on the molecule, thereby creating branch points and a polymeric network. Common examples are ethylene glycol dimethacrylate, tetraethylene glycol dimethacrylate, trimethylolpropane trimethacrylate, methylene bisacrylamide, triallyl cyanurate, and the like.

A "prepolymer" is a reaction product of monomers which contains remaining polymerizable groups capable of undergoing further reaction to form a polymer.

A "polymeric network" is a cross-linked macromolecule that may swell but cannot dissolve in solvents. "Hydrogels" are polymeric networks that swell in water or aqueous solutions, typically absorbing at least 10 weight percent water. "Silicone hydrogels" are hydrogels that are made from at least one silicone-containing component with at least one hydrophilic component. Hydrophilic components may also include non-reactive polymers.

"Conventional hydrogels" refer to polymeric networks made from components without any siloxy, siloxane or carbosiloxane groups. Conventional hydrogels are prepared from reactive mixtures comprising hydrophilic monomers. Examples include 2-hydroxyethyl methacrylate ("HEMA"), N-vinyl pyrrolidone ("NVP"), N, N-dimethylacrylamide ("DMA") or vinyl acetate. U.S. Pat. Nos. 4,436,887, 4,495, 313, 4,889,664, 5,006,622, 5,039459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available conventional hydrogels include, but are not limited to, etafilcon, genfilcon, hilafilcon, lenefilcon, nesofilcon, omafilcon, polymacon, and vifilcon, including all of their variants.

"Silicone hydrogels" refer to polymeric networks made from at least one hydrophilic component and at least one silicone-containing component. Examples of suitable families of hydrophilic components that may be present in the reactive mixture include (meth)acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof. Silicone-containing components are well known and have been extensively described in the patent literature. For instance, the silicone-containing component may comprise at least one polymerizable group (e.g., a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing), at least one siloxane group, and one or more linking groups (which may be a bond) connecting the polymerizable group(s) to the siloxane group(s). The silicone-containing components may, for instance, contain from 1 to 220 siloxane repeat units. The silicone-containing component may also contain at least one fluorine atom. Silicone hydrogel lenses may contain a coating, and the coating may be the same or different material from the substrate.

Examples of silicone hydrogels include acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/0048847. These patents are hereby incorporated by reference in their entireties.

An "interpenetrating polymeric network" comprises two or more networks which are at least partially interlaced on the molecular scale but not covalently bonded to each other and which cannot be separated without braking chemical bonds. A "semi-interpenetrating polymeric network" comprises one or more networks and one or more polymers characterized by some mixing on the molecular level between at least one network and at least one polymer. A mixture of different polymers is a "polymer blend." A semi-interpenetrating network is technically a polymer blend, but in some cases, the polymers are so entangled that they cannot be readily removed.

"Reactive components" are the polymerizable compounds (such as monomers, macromers, oligomers, prepolymers, and cross-linkers) in the reactive mixture (defined below), as well as any other components in the reactive mixture which are intended to substantially remain in the resultant polymeric network after polymerization and all work-up steps (such as extraction steps) and packaging steps have been completed. Reactive components may be retained in the polymeric network by covalent bonding, hydrogen bonding, electrostatic interactions, the formation of interpenetrating polymeric networks, or any other means. Components that are intended to release from the polymeric network once it is in use are still considered "reactive components." For example, pharmaceutical or nutraceutical components in a contact lens which are intended to be released during wear are considered "reactive components." Components that are intended to be removed from the polymeric network during the manufacturing process (e.g., by extraction), such as diluents, are not "reactive components."

The terms "reactive mixture" and "reactive monomer mixture" refer to the mixture of components which are mixed together and, when subjected to polymerization conditions, result in formation of a polymeric network (such as conventional or silicone hydrogels) as well as biomedical devices, ophthalmic devices, and contact lenses made therefrom. The reactive mixture may comprise reactive components such as monomers, macromers, prepolymers, cross-linkers, and initiators, additives such as wetting agents, polymers, dyes, light absorbing compounds such as UV absorbers, pigments, photochromic compounds, pharmaceutical compounds, and/or nutraceutical compounds, any of which may be polymerizable or non-polymerizable but are capable of being retained within the resulting biomedical device (e.g., contact lens). The reactive mixture may also contain other components which are intended to be removed from the device prior to its use, such as diluents. It will be appreciated that a wide range of additives may be added based upon the contact lens which is made and its intended use. Concentrations of components of the reactive mixture are expressed as weight percentages of all reactive components in the reactive mixture, therefore excluding diluents. When diluents are used, their concentrations are expressed as weight percentages based upon the amount of all components in the reactive mixture (including the diluent).

The term "silicone hydrogel contact lens" refers to a hydrogel contact lens that is made from at least one silicone-containing compound. Silicone hydrogel contact lenses generally have increased oxygen permeability compared to conventional hydrogels. Silicone hydrogel contact lenses use both their water and polymer content to transmit oxygen to the eye.

The term "multi-functional" refers to a component having two or more polymerizable groups. The term "mono-functional" refers to a component having one polymerizable group.

The terms "halogen" or "halo" indicate fluorine, chlorine, bromine, and iodine.

"Alkyl" refers to an optionally substituted linear or branched alkyl group containing the indicated number of carbon atoms. If no number is indicated, then alkyl (including any optional substituents on alkyl) may contain 1 to 16 carbon atoms. Preferably, the alkyl group contains 1 to 10 carbon atoms, alternatively 1 to 8 carbon atoms, alternatively 1 to 6 carbon atoms, or alternatively 1 to 4 carbon atoms. Examples of alkyl include methyl, ethyl, propyl, isopropyl, butyl, iso-, sec- and tert-butyl, pentyl, hexyl, heptyl, 3-ethylbutyl, and the like. Examples of substituents on alkyl include 1, 2, or 3 groups independently selected from hydroxy, amino, amido, oxa, carboxy, alkyl carboxy, carbonyl, alkoxy, thioalkyl, carbamate, carbonate, halogen, phenyl, benzyl, and combinations thereof. "Alkylene" means a divalent alkyl group, such as —$CH_2$—, —$CH_2CH_2$—, —$CH_2CH_2CH_2$—, —$CH_2CH(CH_3)CH_2$—, and —$CH_2CH_2CH_2CH_2$—.

"Haloalkyl" refers to an alkyl group as defined above substituted with one or more halogen atoms, where each halogen is independently F, Cl, Br or I. A preferred halogen is F. Preferred haloalkyl groups contain 1-6 carbons, more preferably 1-4 carbons, and still more preferably 1-2 carbons. "Haloalkyl" includes perhaloalkyl groups, such as —$CF_3$— or —$CF_2CF_3$—. "Haloalkylene" means a divalent haloalkyl group, such as —$CH_2CF_2$—.

"Cycloalkyl" refers to an optionally substituted cyclic hydrocarbon containing the indicated number of ring carbon atoms. If no number is indicated, then cycloalkyl may contain 3 to 12 ring carbon atoms. Preferred are $C_3$-$C_8$ cycloalkyl groups, $C_3$-$C_7$ cycloalkyl, more preferably $C_4$-$C_7$ cycloalkyl, and still more preferably $C_5$-$C_6$ cycloalkyl. Examples of cycloalkyl include cyclopropyl, cyclobutyl, cyclopentyl, cyclohexyl, cycloheptyl and cyclooctyl. Examples of substituents on cycloalkyl include 1, 2, or 3 groups independently selected from alkyl, hydroxy, amino, amido, oxa, carbonyl, alkoxy, thioalkyl, amido, carbamate, carbonate, halo, phenyl, benzyl, and combinations thereof. "Cycloalkylene" means a divalent cycloalkyl group, such as 1,2-cyclohexylene, 1,3- cyclohexylene, or 1,4- cyclohexylene.

"Heterocycloalkyl" refers to a cycloalkyl ring or ring system as defined above in which at least one ring carbon has been replaced with a heteroatom selected from nitrogen, oxygen, and sulfur. The heterocycloalkyl ring is optionally fused to or otherwise attached to other heterocycloalkyl rings and/or non-aromatic hydrocarbon rings and/or phenyl rings. Preferred heterocycloalkyl groups have from 5 to 7 members. More preferred heterocycloalkyl groups have 5 or 6 members. Heterocycloalkylene means a divalent heterocycloalkyl group.

"Aryl" refers to an optionally substituted aromatic hydrocarbon ring system containing at least one aromatic ring. The aryl group contains the indicated number of ring carbon atoms. If no number is indicated, then aryl may contain 6 to 14 ring carbon atoms. The aromatic ring may optionally be fused or otherwise attached to other aromatic hydrocarbon rings or non-aromatic hydrocarbon rings. Examples of aryl groups include phenyl, naphthyl, and biphenyl. Preferred examples of aryl groups include phenyl. Examples of substituents on aryl include 1, 2, or 3 groups independently selected from alkyl, hydroxy, amino, amido, oxa, carboxy, alkyl carboxy, carbonyl, alkoxy, thioalkyl, carbamate, carbonate, halo, phenyl, benzyl, and combinations thereof. "Arylene" means a divalent aryl group, for example 1,2-phenylene, 1,3-phenylene, or 1,4-phenylene.

"Heteroaryl" refers to an aryl ring or ring system, as defined above, in which at least one ring carbon atom has been replaced with a heteroatom selected from nitrogen, oxygen, and sulfur. The heteroaryl ring may be fused or otherwise attached to one or more heteroaryl rings, aromatic or nonaromatic hydrocarbon rings or heterocycloalkyl rings. Examples of heteroaryl groups include pyridyl, furyl, pyrazinyl, benzimidazolyl, and thienyl. "Heteroarylene" means a divalent heteroaryl group.

"Alkoxy" refers to an alkyl group attached to the parent molecular moiety through an oxygen bridge. Examples of alkoxy groups include, for instance, methoxy, ethoxy, propoxy and isopropoxy. "Thioalkyl" means an alkyl group attached to the parent molecule through a sulfur bridge. Examples of thioalkyl groups include, for instance, methylthio, ethylthio, n-propylthio and iso-propylthio. "Aryloxy" refers to an aryl group attached to a parent molecular moiety through an oxygen bridge. Examples include phenoxy. "Cyclic alkoxy" means a cycloalkyl group attached to the parent moiety through an oxygen bridge.

"Alkylamine" refers to an alkyl group attached to the parent molecular moiety through an —NH bridge. Alkyleneamine means a divalent alkylamine group, such as —CH$_2$CH$_2$NH—.

"Siloxanyl" refers to a structure having at least one Si—O—Si bond. Thus, for example, siloxanyl group means a group having at least one Si—O—Si group (i.e. a siloxane group), and siloxanyl compound means a compound having at least one Si—O—Si group. "Siloxanyl" encompasses monomeric (e.g., Si—O—Si) as well as oligomeric/polymeric structures (e.g., —[Si—O]$_n$—, where n is 2 or more). Each silicon atom in the siloxanyl group is substituted with independently selected R$^A$ groups (where R$^A$ is as defined in formula A options (b)-(i)) to complete their valence.

"Silyl" refers to a structure of formula R$_3$Si— and "siloxy" refers to a structure of formula R$_3$Si—O—, where each R in silyl or siloxy is independently selected from trimethylsiloxy, C$_1$-C$_8$ alkyl (preferably C$_1$-C$_3$ alkyl, more preferably ethyl or methyl), and C$_3$-C$_8$ cycloalkyl.

"Alkyleneoxy" refers to groups of the general formula -(alkylene-O)$_p$— or —(O-alkylene)$_p$-, wherein alkylene is as defined above, and p is from 1 to 200, or from 1 to 100, or from 1 to 50, or from 1 to 25, or from 1 to 20, or from 1 to 10, wherein each alkylene is independently optionally substituted with one or more groups independently selected from hydroxyl, halo (e.g., fluoro), amino, amido, ether, carbonyl, carboxyl, and combinations thereof. If p is greater than 1, then each alkylene may be the same or different and the alkyleneoxy may be in block or random configuration. When alkyleneoxy forms a terminal group in a molecule, the terminal end of the alkyleneoxy may, for instance, be a hydroxy or alkoxy (e.g., HO—[CH$_2$CH$_2$O]$_p$— or CH$_3$O—[CH$_2$CH$_2$O]$_p$—). Examples of alkyleneoxy include polyethyleneoxy, polypropyleneoxy, polybutyleneoxy, and poly(ethyleneoxy-co-propyleneoxy).

"Oxaalkylene" refers to an alkylene group as defined above where one or more non-adjacent CH$_2$ groups have been substituted with an oxygen atom, such as —CH$_2$CH$_2$OCH(CH$_3$)CH$_2$—. "Thiaalkylene" refers to an alkylene group as defined above where one or more non-adjacent CH$_2$ groups have been substituted with a sulfur atom, such as —CH$_2$CH$_2$S CH(CH$_3$)CH$_2$—.

The term "linking group" refers to a moiety that links a polymerizable group to the parent molecule. The linking group may be any moiety that is compatible with the compound of which it is a part, and that does not undesirably interfere with the polymerization of the compound, is stable under the polymerization conditions as well as the conditions for the processing and storage of the final product. For instance, the linking group may be a bond, or it may comprise one or more alkylene, haloalkylene, amide, amine, alkyleneamine, carbamate, ester (—CO$_2$—), arylene, heteroarylene, cycloalkylene, heterocycloalkylene, alkyleneoxy, oxaalkylene, thiaalkylene, haloalkyleneoxy (alkyleneoxy substituted with one or more halo groups, e.g., —OCF$_2$—, —OCF$_2$CF$_2$—, —OCF$_2$CH$_2$—), siloxanyl, alkylenesiloxanyl, or combinations thereof. The linking group may optionally be substituted with 1 or more substituent groups. Suitable substituent groups may include those independently selected from alkyl, halo (e.g., fluoro), hydroxyl, HO-alkyleneoxy, MeO-alkyleneoxy, siloxanyl, siloxy, siloxy-alkyleneoxy-, siloxy-alkylene-alkyleneoxy- (where more than one alkyleneoxy groups may be present and wherein each methylene in alkylene and alkyleneoxy is independently optionally substituted with hydroxyl), ether, amine, carbonyl, carbamate, and combinations thereof. The linking group may also be substituted with a polymerizable group, such as (meth)acrylate (in addition to the polymerizable group to which the linking group is linked).

Preferred linking groups include C$_1$-C$_8$ alkylene (preferably C$_2$-C$_6$ alkylene), C$_1$-C$_8$ oxaalkylene (preferably C$_2$-C$_6$ oxaalkylene), C$_1$-C$_8$ thiaalkylene, C$_1$-C$_8$ alkylene-carboxylate-C$_1$-C$_8$ alkylene, C$_1$-C$_8$ alkylene-amide-C$_1$-C$_8$ alkylene, and C$_1$-C$_8$ alkylene-amine-C$_1$-C$_8$ alkylene, each of which is optionally substituted with 1 or 2 groups independently selected from hydroxyl and siloxy.

When the linking group is comprised of combinations of moieties as described above (e.g., alkylene and cycloalkylene), the moieties may be present in any order. For instance, if in Formula A below, L is indicated as being -alkylene-cycloalkylene-, then Rg-L may be either Rg-alkylene-cycloalkylene-, or Rg-cycloalkylene-alkylene-. Notwithstanding this, the listing order represents the preferred order in which the moieties appear in the compound starting from the terminal polymerizable group (Rg or Pg) to which the linking group is attached. For example, if in Formula A, L is indicated as being alkylene-cycloalkylene, then Rg-L is preferably Rg-alkylene-cycloalkylene-.

The terms "light absorbing compound" refers to a chemical material that absorbs light within the visible spectrum (e.g., in the 380 to 780 nm range). A material's ability to absorb certain wavelengths of light can be determined by measuring its UV/Vis transmission or absorbance spectrum.

When the compounds described herein contain olefinic double bonds or other centers of geometric asymmetry, and unless otherwise specified, it is intended that the compounds include the cis, trans, Z- and E-configurations. Likewise, all tautomeric and salt forms are also intended to be included.

The term "optional substituent" means that a hydrogen atom in the underlying moiety is optionally replaced by a substituent. Any substituent may be used that is sterically practical at the substitution site and is synthetically feasible. Identification of a suitable optional substituent is well within the capabilities of an ordinarily skilled artisan. Examples of an "optional substituent" include, without limitation, $C_1$-$C_6$ alkyl, $C_1$-$C_6$ alkoxy, $C_1$-$C_6$ thioalkyl, $C_3$-$C_7$ cycloalkyl, aryl, halo, hydroxy, amino, $NR^4R^5$, benzyl, $SO_3H$, $SO_3Na$, or —L—$P_g$, wherein $R^4$ and $R^5$ are independently H or $C_1$-$C_6$ alkyl, L is a linking group; and $P_g$ is a polymerizable group. The foregoing substituents may be optionally substituted by an optional substituent (which, unless otherwise indicated, is preferably not further substituted). For instance, alkyl may be substituted by halo (resulting, for instance, in $CF_3$).

"Substructure" means a compound having the indicated chemical structure as well as any compound that is derived from the indicated chemical structure via the replacement of one or more hydrogen atoms by any other atom (which atom may be bound to other atoms or groups). Replacement, for instance, may be of one or more, preferably 1 or 2, more preferably 1, hydrogen atoms with an independently selected optional substituent. Encompassed within the definition of "substructure" are materials wherein the indicated chemical structure forms a fragment of a larger compound, such as a monomer (e.g., containing one or more polymerizable groups), a polymer, or a macromolecule.

"Visible light absorption maximum" means a wavelength in the visible light wavelength range (380 to 760 nm) at which a light absorbance is a maximum. The definition encompasses materials that exhibit overall absorption maxima outside of the visible light range, such as within the UV region.

Unless otherwise indicated, ratios, percentages, parts, and the like are by weight.

Unless otherwise indicated, numeric ranges, for instance as in "from 2 to 10" or "between 2 and 10" are inclusive of the numbers defining the range (e.g., 2 and 10).

As noted above, in one aspect, the invention provides compounds that contain visible light absorbing chromophores. The compounds may, for instance, absorb visible light across the range of 500 to 625 nm, or across the range of 550 to 600 nm. Preferably, the compounds exhibit a visible light absorbance maximum between 560 and 585 nm, more preferably between 570 and 580 nm.

The compounds of the invention contain a visible light absorbing chromophores having a substructure of formula I:

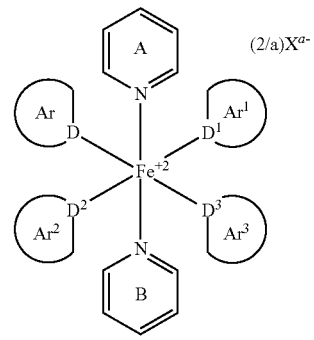

(I)

wherein a is 1 or 2 and X is a monovalent or divalent anion; D, $D^1$, $D^2$, and $D^3$ are independently N, O, or S; and Ar, $Ar^1$, $Ar^2$, and $Ar^3$, respectively together with D, $D^1$, $D^2$, and $D^3$, are independently heteroaryl, wherein Ar and $Ar^1$ are independently optionally directly bonded to pyridinyl ring A, $Ar^2$ and $Ar^3$ are independently optionally directly bonded to pyridinyl ring B, Ar and $Ar^2$ are optionally directly bonded to each other, and $A^1$ and $Ar^3$ are optionally directly bonded to each other.

Substructures of formula I preferably contain one or more L-$P_g$ groups, for instance one, two, or three such groups, wherein L is a linking group and $P_g$ is a polymerizable group. More preferably, the substructures contain one or two L-$P_g$ groups.

Substructures of formula I may include substructures of formula I-1, which are substructures of formula I wherein a is 1.

Substructure of formulae I and I-1 may include substructures of formula I-2, which are substructures of formula I or I-1 wherein X is Cl, Br, I, $PF_6$, $BF_4$, $ClO_4$, or $NO_3$. Preferably, X is $PF_6$.

Substructures of formulae I, I-1, and I-2 may include substructures of formula I-3, which are substructures of formula I, I-1, or I-2 wherein D, $D^1$, $D^2$, and $D^3$ are independently N or O.

Substructures of formulae I, I-1, I-2, and I-3 may include substructures of formula I-4, which are substructures of formula I, I-1, I-2, or I-3 wherein Ar, $Ar^1$, $Ar^2$, and $Ar^3$, respectively together with D, $D^1$, $D^2$, and $D^3$, are independently pyridinyl, pyrazinyl, furyl, or benzimidazolyl.

Substructures of formulae I, I-1, I-2, I-3, and I-4 may include substructures of formula I-5, which are substructures of formula I, I-1, I-2, I-3, or I-4 wherein Ar is directly bonded to pyridinyl ring A in the formula I substructure. For instance, Ar and pyridinyl ring A may together form a bipyridinyl group.

Substructures of formulae I, I-1, I-2, I-3, I-4, and I-5 may include substructures of formula I-6, which are substructures of formula I, I-1, I-2, I-3, I-4, or I-5 wherein $Ar^1$ is directly bonded to pyridinyl ring A in the formula I substructure. For instance, $Ar^1$ and pyridinyl ring A may together form a bipyridinyl group.

Substructures of formulae I, I-1, I-2, I-3, I-4, I-5, and I-6 may include substructures of formula I-7, which are substructures of formula I, I-1, I-2, I-3, I-4, I-5, or I-6 wherein Ar and $Ar^1$ are each directly bonded to pyridinyl ring A in the formula I substructure. For instance, Ar, $Ar^1$ and pyridinyl ring A may together form a terpyridinyl group.

Substructures of formulae I, I-1, I-2, I-3, I-4, I-5, I-6, and I-7 may include substructures of formula I-8, which are substructures of formula I, I-1, I-2, I-3, I-4, I-5, I-6, or I-7 wherein Ar² is directly bonded to pyridinyl ring B in the formula I Substructure. For instance, Ar² and pyridinyl ring B may together form a bipyridinyl group.

Substructures of formulae I, I-1, I-2, I-3, I-4, I-5, I-6, I-7, and I-8 may include substructures of formula I-9, which are substructures of formula I, I-1, I-2, I-3, I-4, I-5, I-6, I-7, or I-8 wherein Ar³ is directly bonded to pyridinyl ring B in the formula I substructure. For instance, Ar³ and pyridinyl ring B may together form a bipyridinyl group.

Substructures of formulae I, I-1, I-2, I-3, I-4, I-5, I-6, I-7, I-8, and I-9 may include substructures of formula I-10, which are substructures of formula I, I-1, I-2, I-3, I-4, I-5, I-6, or I-7, I-8, or I-9 wherein Ar² and Ar³ are each directly bonded to pyridinyl ring B in the formula I substructure. For instance, Ar², Ar³ and pyridinyl ring B may together form a terpyridinyl group.

Substructures of formulae I, I-1, I-2, I-3, I-4, I-5, I-6, I-7, I-8, I-9, and I-10 may include substructures of formula I-11, which are substructures of formula I, I-1, I-2, I-3, I-4, I-5, I-6, I-7, I-8, I-9, or I-10 wherein Ar and Ar² are directly bonded to each other. Preferably, if Ar and Ar² are directly bonded to each other, then Ar¹ and Ar³ are not directly bonded to each other.

Substructures of formulae I, I-1, I-2, I-3, I-4, I-5, I-6, I-7, I-8, I-9, I-10, and I-11 may include substructures of formula I-12, which are substructures of formula I, I-1, I-2, I-3, I-4, I-5, I-6, I-7, I-8, I-9, I-10, or I-11 wherein Ar¹ and Ar³ are optionally directly bonded to each other. Preferably, if Ar¹ and Ar³ are directly bonded to each other, then Ar and Ar² are not directly bonded to each other.

Substructures of formulae I, I-1, I-2, I-3, I-4, I-5, I-6, I-7, I-8, I-9, I-10, I-11, and I-12 may include substructures of formula I-13, which are substructures of formula I, I-1, I-2, I-3, I-4, I-5, I-6, I-7, I-8, I-9, I-10, I-11, or I-12 wherein the linking group at each occurrence, when present, is independently a bond, or one or more alkylene, haloalkylene, amide, amine, alkyleneamine, carbamate, ester (—CO₂—), arylene, heteroarylene, cycloalkylene, heterocycloalkylene, alkyleneoxy, oxaalkylene, thiaalkylene, haloalkyleneoxy, siloxanyl, alkylenesiloxanyl, or combinations thereof, each of which is optionally substituted with alkyl, halo, hydroxyl, HO-alkyleneoxy, MeO-alkyleneoxy, siloxanyl, siloxy, siloxy-alkyleneoxy-, siloxy-alkylene-alkyleneoxy-, ether, amine, carbonyl, carbamate, or a combination of two or more thereof. The linking group at each occurrence may be independently $C_1$-$C_8$ alkylene, $C_1$-$C_8$ oxaalkylene, $C_1$-$C_8$ thiaalkylene, carboxylate-$C_1$-$C_8$ alkylene, $C_1$-$C_8$ alkylene-carboxylate-$C_1$-$C_8$ alkylene, $C_1$-$C_8$ alkylene-amide-$C_1$-$C_8$ alkylene, arylene-$C_1$-$C_8$ alkyleneoxy, arylene-amine-$C_1$-$C_8$ alkylene, or $C_1$-$C_8$ alkylene-amine-$C_1$-$C_8$ alkylene.

Substructures of formulae I, I-1, I-2, I-3, I-4, I-5, I-6, I-7, I-8, I-9, I-10, I-11, I-12, and I-13 may include substructures of formula I-14, which are substructures of formula I, I-1, I-2, I-3, I-4, I-5, I-6, I-7, I-8, I-9, I-10, I-11, I-12, or I-13 wherein the polymerizable group, when present, independently at each occurrence is styryl, vinyl carbonate, vinyl ether, vinyl carbamate, N-vinyl lactam, N-vinylamide, (meth)acrylate, or (meth)acrylamide. The polymerizable group allows the Substructures of the invention to form covalent bonds when reacted with monomers, crosslinking agents, and other components generally used in making polymeric devices. The compatibility of the Substructures with the reactive mixture can be controlled via the selection of the polymerizable group (and the linking group). Preferred polymerizable groups include (meth)acrylate, (meth) acrylamide, N-vinyl lactam, N-vinylamide, vinyl carbonate, vinyl ether, vinyl carbamate, and styryl. More preferred polymerizable groups include (meth)acrylate or (meth)acrylamide. A particularly preferred polymerizable group is methacrylate.

Substructures of formulae I, I-1, I-2, I-3, I-4, I-5, I-6, I-7, I-8, I-9, I-10, I-11, I-12, I-13, and I-14 may include substructures of formula I-15, which are substructures of formula I, I-1, I-2, I-3, I-4, I-5, I-6, I-7, I-8, I-9, I-10, I-11, I-12, I-13, or I-14 wherein at least two of Ar, Ar¹, Ar², Ar³, pyridinyl ring A, and pyridinyl ring B are directly bonded to each other.

Compounds of the invention may be of formula II:

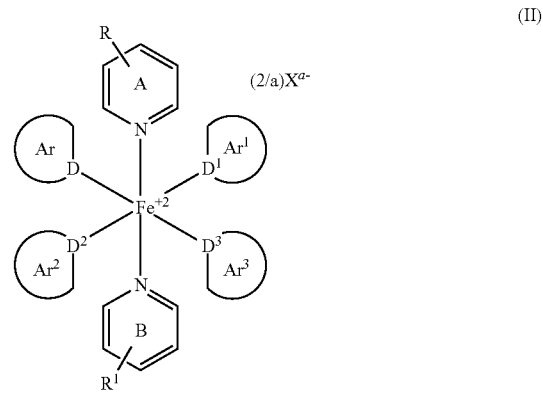

(II)

wherein a is 1 or 2 and X is a monovalent or divalent anion; R and R¹ are independently H, alkyl, aryl, heteroaryl, alkenyl, alkynyl, —COR², —COOR², —CONR²R³, CO(C=O)NR²R³, —OR², —SR², —SOR², —SO₂R², —NR²R³ or —L—$P_g$; D, D¹, D², and D³ are independently N, O, or S; Ar, Ar¹, Ar², and Ar³, respectively together with D, D¹, D², and D³, are independently a heteroaryl ring each optionally substituted with alkyl, aryl, heteroaryl, alkenyl, alkynyl, —COR², —COOR², —CONR²R³, CO(C=O) NR²R³, —OR², —SR², —SOR², —SO₂R², —NR²R³ or —L—$P_g$, wherein R² and R³ at each occurrence are independently H or alkyl, Ar and Ar¹ are independently optionally directly bonded to pyridinyl ring A, Ar² and Ar³ are independently optionally directly bonded to pyridinyl ring B, Ar and Ar² are optionally directly bonded to each other, Ar¹ and Ar³ are optionally directly bonded to each other, L at each occurrence is independently a linking group, and $P_g$ at each occurrence is independently a polymerizable group.

Compounds of formula II preferably contain one or more L-$P_g$ groups, for instance one, two, or three such groups. More preferably, the compounds contain one L-$P_g$ group.

Compounds of formula II may include compounds of formula II-1, which are compounds of formula II wherein a is 1.

Compound of formulae II and II-1 may include compounds of formula II-2, which are compounds of formula II or II-1 wherein X is $C_1$, Br, I, $PF_6$, $BF_4$, $ClO_4$, or $NO_3$. Preferably, X is $PF_6$.

Compounds of formulae II, II-1, and II-2 may include compounds of formula II-3, which are compounds of formula II, II-1, or II-2 wherein D, D¹⁻, D², and D³ are independently N or O.

Compounds of formulae II, II-1, II-2, and II-3 may include compounds of formula II-4, which are compounds of formula II, II-1, II-2, or II-3 wherein Ar, Ar¹, Ar², and Ar³, respectively together with D, D¹, D², and D³, are independently pyridinyl, pyrazinyl, furyl, or benzimidazolyl, each containing one or more optional substituents. Exemplary optional substituents include alkyl, aryl, heteroaryl, alkenyl, alkynyl, —$COR^2$, —$COOR^2$, —$CONR^2R^3$, $CO(C=O)NR^2R^3$, —$OR^2$, —$SR^2$, —$SOR^2$, —$SO_2R^2$, —$NR^2R^3$, or —L—$P_g$ wherein $R^2$ and $R^3$ at each occurrence are independently H or alkyl, L at each occurrence is independently a linking group, and $P_g$ at each occurrence is independently a polymerizable group.

Compounds of formulae II, II-1, II-2, II-3, and II-4 may include compounds of formula II-5, which are compounds of formula II, II-1, II-2, II-3, or II-4 wherein Ar is directly bonded to pyridinyl ring A in the formula II compound. For instance, Ar and pyridinyl ring A may together form a bipyridinyl group.

Compounds of formulae II, II-1, II-2, II-3, II-4, and II-5 may include compounds of formula II-6, which are compounds of formula II, II-1, II-2, II-3, II-4, or II-5 wherein $Ar^1$ is directly bonded to pyridinyl ring A in the formula II compound. For instance, $Ar^1$ and pyridinyl ring A may together form a bipyridinyl group.

Compounds of formulae II, II-1, II-2, II-3, II-4, II-5, and II-6 may include compounds of formula II-7, which are compounds of formula II, II-1, II-2, II-3, II-4, II-5, or II-6 wherein Ar and $Ar^1$ are each directly bonded to pyridinyl ring A in the formula II compound. For instance, Ar, $Ar^1$ and pyridinyl ring A may together form a terpyridinyl group.

Compounds of formulae II, II-1, II-2, II-3, II-4, II-5, II-6, and II-7 may include compounds of formula II-8, which are compounds of formula II, II-1, II-2, II-3, II-4, II-5, II-6, or II-7 wherein $Ar^2$ is directly bonded to pyridinyl ring B in the formula II compound. For instance, $Ar^2$ and pyridinyl ring B may together form a bipyridinyl group.

Compounds of formulae II, II-1, II-2, II-3, II-4, II-5, II-6, II-7, and II-8 may include compounds of formula II-9, which are compounds of formula II, II-1, II-2, II-3, II-4, II-5, II-6, II-7, or II-8 wherein $Ar^3$ is directly bonded to pyridinyl ring B in the formula II compound. For instance, $Ar^3$ and pyridinyl ring B may together form a bipyridinyl group.

Compounds of formulae II, II-1, II-2, II-3, II-4, II-5, II-6, II-7, II-8, and II-9 may include compounds of formula II-10, which are compounds of formula II, II-1, II-2, II-3, II-4, II-5, II-6, or II-7, II-8, or II-9 wherein $Ar^2$ and $Ar^3$ are each directly bonded to pyridinyl ring B in the formula II compound. For instance, $Ar^2$, $Ar^3$ and pyridinyl ring B may together form a terpyridinyl group.

Compounds of formulae II, II-1, II-2, II-3, II-4, II-5, II-6, II-7, II-8, II-9, and II-10 may include compounds of formula II-11, which are compounds of formula II, II-1, II-2, II-3, II-4, II-5, II-6, II-7, II-8, II-9, or II-10 wherein Ar and $Ar^2$ are directly bonded to each other. Preferably, if Ar and $Ar^2$ are directly bonded to each other, then $Ar^1$ and $Ar^3$ are not directly bonded to each other.

Compounds of formulae II, II-1, II-2, II-3, II-4, II-5, II-6, II-7, II-8, II-9, II-10, and II-11 may include compounds of formula II-12, which are compounds of formula II, II-1, II-2, II-3, II-4, I-5, II-6, II-7, II-8, II-9, II-10, or II-11 wherein $Ar^1$ and $Ar^3$ are optionally directly bonded to each other. Preferably, if $Ar^1$ and $Ar^3$ are directly bonded to each other, then Ar and $Ar^2$ are not directly bonded to each other.

Compounds of formulae II, II-1, II-2, II-3, II-4, II-5, II-6, II-7, II-8, II-9, II-10, II-11, and II-12 may include compounds of formula II-13, which are compounds of formula II, II-1, II-2, II-3, II-4, II-5, II-6, II-7, II-8, II-9, II-10, II-11, or II-12 wherein the linking group at each occurrence is independently a bond, or one or more alkylene, haloalkylene, amide, amine, alkyleneamine, carbamate, ester (—$CO_2$—), arylene, heteroarylene, cycloalkylene, heterocycloalkylene, alkyleneoxy, oxaalkylene, thiaalkylene, haloalkyleneoxy, siloxanyl, alkylenesiloxanyl, or combinations thereof, each of which is optionally substituted with alkyl, halo, hydroxyl, HO-alkyleneoxy, MeO-alkyleneoxy, siloxanyl, siloxy, siloxy-alkyleneoxy-, siloxy-alkylene-alkyleneoxy-, ether, amine, carbonyl, carbamate, or a combination of two or more thereof. The linking group at each occurrence may be independently $C_1$-$C_8$ alkylene, $C_1$-$C_8$ oxaalkylene, $C_1$-$C_8$ thiaalkylene, carboxylate-$C_1$-$C_8$ alkylene, $C_1$-$C_8$ alkylene-carboxylate-$C_1$-$C_8$ alkylene, $C_1$-$C_8$ alkylene-amide-$C_1$-$C_8$ alkylene, arylene-$C_1$-$C_8$ alkyleneoxy, arylene-amine-$C_1$-$C_8$ alkylene, or $C_1$-$C_8$ alkylene-amine-$C_1$-$C_8$ alkylene.

Compounds of formulae II, II-1, II-2, II-3, II-4, II-5, II-6, II-7, II-8, II-9, II-10, II-11, II-12, and II-13 may include compounds of formula II-14, which are compounds of formula II, II-1, II-2, II-3, II-4, II-5, II-6, II-7, II-8, II-9, II-10, II-11, II-12, or II-13 wherein the polymerizable group independently at each occurrence is styryl, vinyl carbonate, vinyl ether, vinyl carbamate, N-vinyl lactam, N-vinylamide, (meth)acrylate, or (meth)acrylamide. Preferred polymerizable groups include (meth)acrylate, (meth)acrylamide, N-vinyl lactam, N-vinylamide, vinyl carbonate, vinyl ether, vinyl carbamate, and styryl. More preferred polymerizable groups include (meth)acrylate or (meth)acrylamide. A particularly preferred polymerizable group is methacrylate.

Compounds of formulae II, II-1, II-2, II-3, II-4, II-5, II-6, II-7, II-8, II-9, II-10, II-11, II-12, II-13, and II-14 may include compounds of formula II-15, which are compounds of formula II, II-1, II-2, II-3, II-4, II-5, II-6, II-7, II-8, II-9, II-10, II-11, II-12, II-13, or II-14 wherein at least two of Ar, $Ar^1$, $Ar^2$, $Ar^3$, pyridinyl ring A, and pyridinyl ring B are directly bonded to each other.

Compounds of formulae II, II-1, II-2, II-3, II-4, II-5, II-6, II-7, II-8, II-9, II-10, II-11, II-12, II-13, II-14, and II-15 may include compounds of formula III:

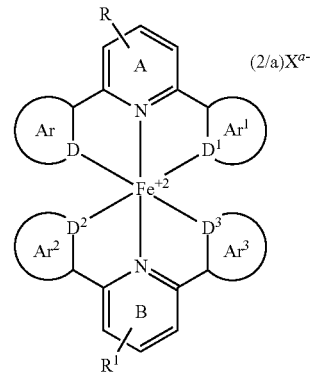

(III)

Specific examples of compounds of the invention are shown in Table A.

TABLE A

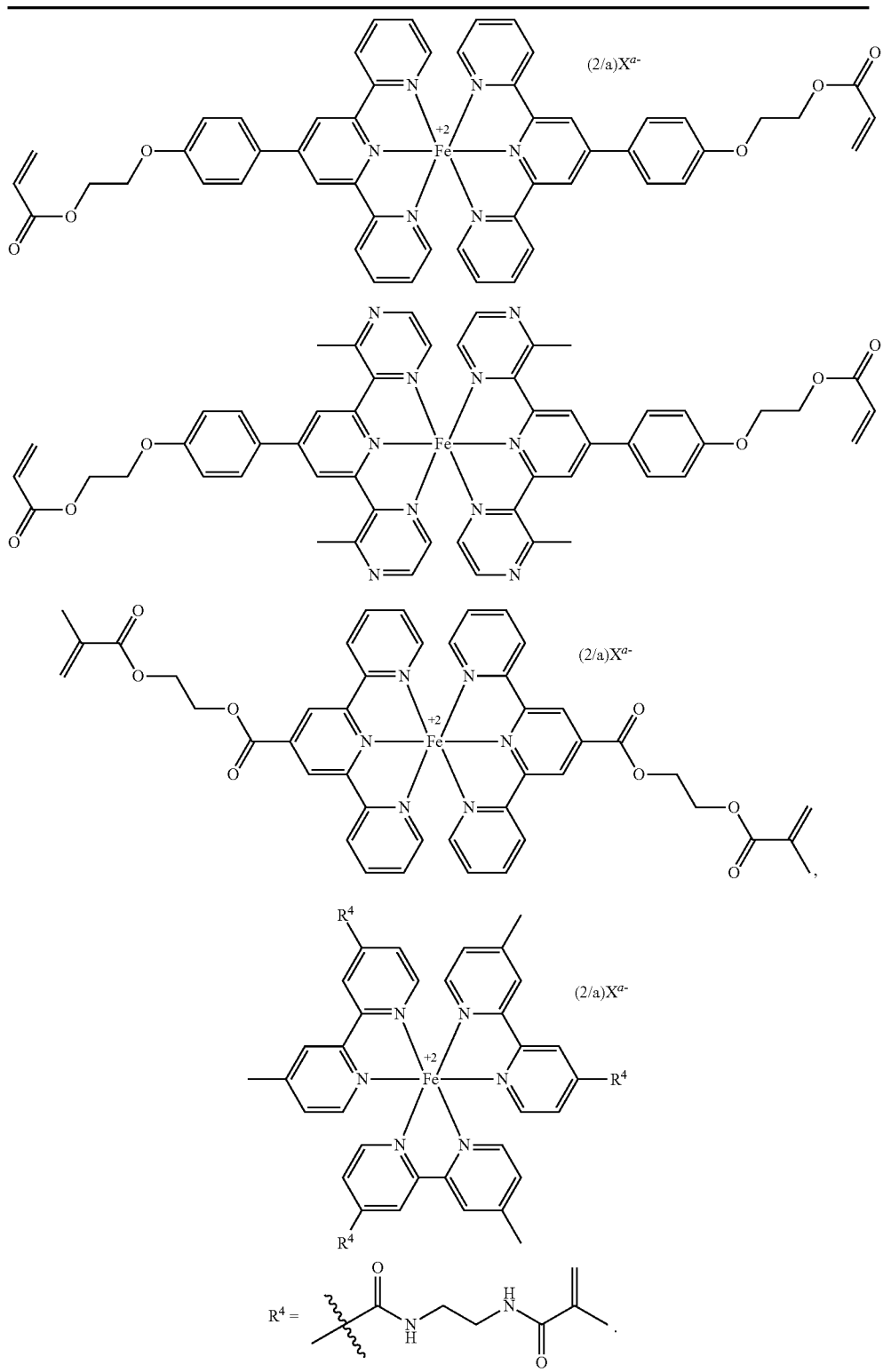

Compounds of the invention may be prepared by those skilled in the art using literature methods. By way of example, various compounds may be prepared as shown in Scheme 1 and 2 with the associated description. Exemplary reagents and procedures for these reactions appear in the working examples.

Scheme 1

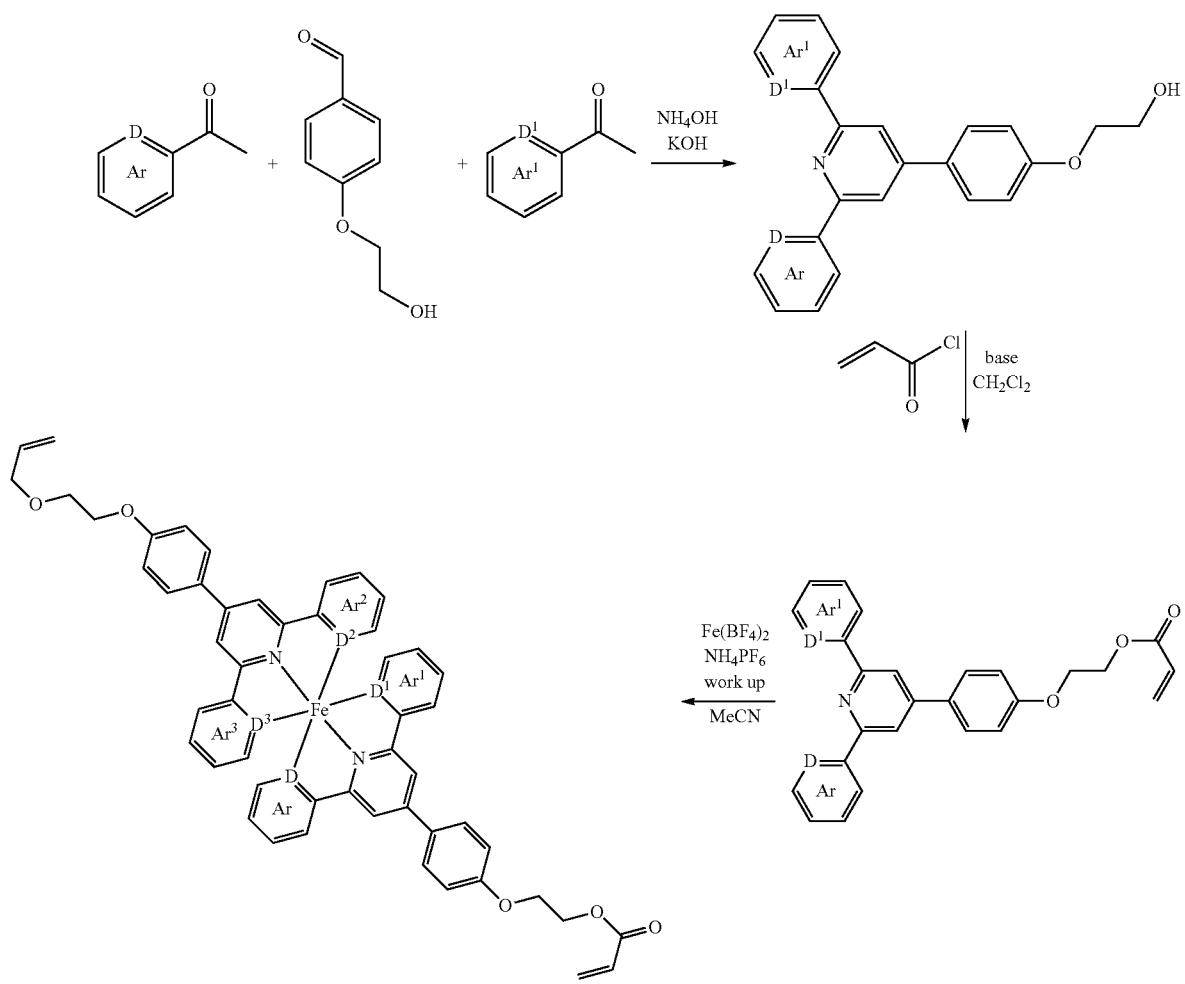

Scheme 1 shows a method for preparing exemplary compounds of the invention. Thus, using a Kröhnke pyridine synthesis, a wide variety of 2,4,6-trisubstituted pyridines can by synthesized under mild conditions. Each of these 2,4,6-trisubstituted pyridines can be converted to their respective monomers (acrylate shown) using the respective acid chlorides and base. The 2,4,6-trisubstituted pyridine monomers are then utilized as ligands in a salt metathesis reaction generating the iron complexes.

Scheme 2

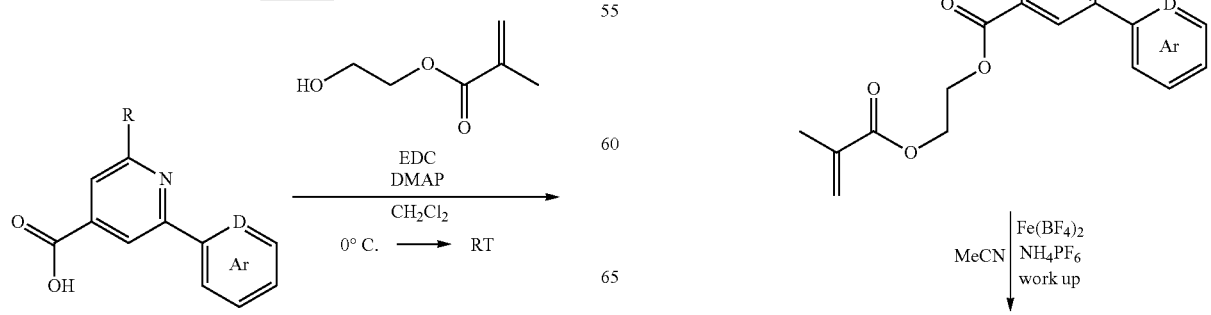

-continued

-continued

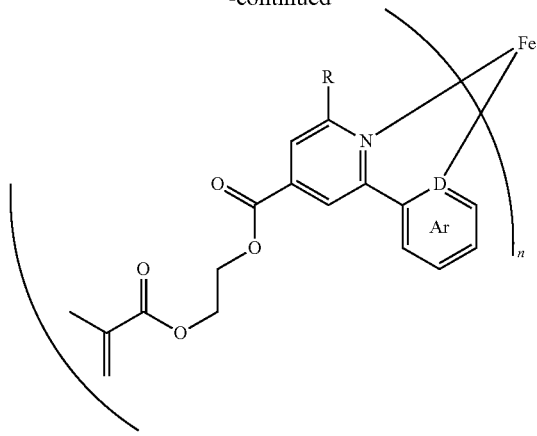

Scheme 2 shows an alternative method for preparing exemplary compounds of the invention. Starting from known carboxylic acids, carbodiimide coupling (1,ethyl-3-(3-dimethylaminopropyl)carbodiimide (EDC) shown) coupling with HEMA (shown) or N-(2-aminoethyl)methacrylamide allows for the formation of either the methacrylate or acrylamide, respectively. The pyridine monomers can be utilized as ligands in a salt metathesis reaction generating the iron complexes. When R=H, n=3 resulting in a tris complex, while when R=Ar, n=2 resulting in a bis complex.

Compounds of the invention may be used in combination with other light absorbing compounds to provide desirable absorption characteristics. For example, preferred compositions may comprise a compound as described above together with a UV absorbing compound. Suitable UV absorbing compounds are known in the art and fall into several classes which include, but are not limited to, benzophenones, benzotriazoles, triazines, substituted acrylonitriles, salicyclic acid derivatives, benzoic acid derivatives, cinnamic acid derivatives, chalcone derivatives, dypnone derivatives, crotonic acid derivatives, or any mixtures thereof. A preferred class of UV absorbing compound is benzotriazoles, such as Norbloc (2-(2'-hydroxy-5-methacrylyloxyethylphenyl)-2H-benzotriazole).

Compounds of the invention may be included in reactive mixtures to form various products, including biomedical devices and ophthalmic devices. The compounds may, for instance, be incorporated within a device, and/or they may be coated on the surface of a device. When incorporated within a device, the compounds may generally be added to the reactive mixture from which the device is made and may be present in any amount up to the limit of their solubility. For instance, the compounds may be present at concentration of at least 0.1 percent or at least 2 percent; and up to 10 percent or up to 5 percent, based on the weight percentages of all components in the reactive mixture, excluding diluent. A typical concentration may be in the range of 1 to 5 percent. The upper limit is typically determined by the solubility of the compound with other co-monomers and or diluents in the reactive monomer mix.

Preferably, the compounds of the invention are included in ophthalmic devices. A variety of ophthalmic devices may be prepared, including spectacles, sunglasses, hard contact lenses, soft contact lenses, corneal onlays, corneal inlays, intraocular lenses, or overlay lenses. Preferably, the ophthalmic device is an intraocular lens or a soft contact lens. The soft contact lens may be made from a conventional (non-silicone) hydrogel or from a silicone hydrogel.

Ophthalmic devices of the invention may comprise a free radical reaction product of a reactive mixture containing one or more monomers suitable for making the desired ophthalmic device (also referred to herein as device forming monomers or hydrogel forming monomers), and optional components. When polymerized, the reactive mixture results in formation of a polymeric network of which the ophthalmic device may be comprised. The polymeric network may, for instance, be a hydrogel (e.g., a conventional hydrogel or a silicone hydrogel).

A compound of the invention may be copolymerized with the other components in the reactive mixture, in which case the reactive mixture may, in addition to one or more monomers suitable for making the desired ophthalmic device (and any optional components), also contain one or more of the invention compounds.

Non-limiting examples of polymeric networks in which the invention compound may be incorporated (for instance, as a monomer) are described above and include, for instance, etafilcon, genfilcon, hilafilcon, lenefilcon, nesofilcon, omafilcon, polymacon, vifilcon, acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants.

By way of further example, a polymeric network may be made from a reactive mixture comprising one or more of: hydrophilic components, hydrophobic components, silicone-containing components, wetting agents such as polyamides, crosslinking agents, and further components such as diluents and initiators. As discussed above, the reactive mixture may also contain one or more inventive compounds.

Hydrophilic Components

Examples of suitable families of hydrophilic monomers that may be present in the reactive mixture include (meth)acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof.

Non-limiting examples of hydrophilic (meth)acrylate and (meth)acrylamide monomers include: acrylamide, N-isopropyl acrylamide, N,N-dimethylaminopropyl (meth)acrylamide, N,N-dimethyl acrylamide (DMA), 2-hydroxyethyl methacrylate (HEMA), 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth) acrylamide, N-(3-hydroxybutyl) (meth)acrylamide, N-(4-hydroxybutyl) (meth)acrylamide, 2-aminoethyl (meth)acrylate, 3-aminopropyl (meth)acrylate, 2-aminopropyl (meth)acrylate, N-2-aminoethyl (meth)acrylamides), N-3-aminopropyl (meth)acrylamide, N-2-aminopropyl (meth)acrylamide, N,N-bis-2-aminoethyl (meth)acrylamides, N,N-bis-3-aminopropyl (meth)acrylamide), N,N-bis-2-aminopropyl (meth)acrylamide, glycerol methacrylate, polyethyleneglycol monomethacrylate, (meth)acrylic acid, vinyl acetate, acrylonitrile, and mixtures thereof.

Hydrophilic monomers may also be ionic, including anionic, cationic, zwitterions, betaines, and mixtures thereof. Non-limiting examples of such charged monomers include (meth)acrylic acid, N-[(ethenyloxy)carbonyl]-β-alanine (VINAL), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT), 1-propanaminium, N,N-dimethyl-N-[3-[(1-oxo-2-propen-1-yl)amino]propyl]-3-sulfo-, inner salt (SBT), 3,5-Dioxa-8-aza-4-phosphaundec-10-en-1-aminium, 4-hydroxy-N,N,N-trimethyl-9-oxo-, inner salt, 4-oxide (9CI) (PBT), 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), and methacryloyloxy)propyl)dimethylammonio)propane-1-sulfonate (MAPDAPS).

Non-limiting examples of hydrophilic N-vinyl lactam and N-vinyl amide monomers include: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2- pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-vinylimidazole, and mixtures thereof Non-limiting examples of hydrophilic 0-vinyl carbamates and O-vinyl carbonates monomers include N-2-hydroxyethyl vinyl carbamate and N-carboxy-β-alanine N-vinyl ester. Further examples of hydrophilic vinyl carbonate or vinyl carbamate monomers are disclosed in U.S. Pat. No. 5,070,215. Hydrophilic oxazolone monomers are disclosed in U.S. Pat. No. 4,910,277.

Other hydrophilic vinyl compounds include ethylene glycol vinyl ether (EGVE), di(ethylene glycol) vinyl ether (DEGVE), allyl alcohol, and 2-ethyl oxazoline.

The hydrophilic monomers may also be macromers or prepolymers of linear or branched poly(ethylene glycol), poly(propylene glycol), or statistically random or block copolymers of ethylene oxide and propylene oxide, having polymerizable moieties such as (meth)acrylates, styrenes, vinyl ethers, (meth)acrylamides, N-vinylamides, and the like. The macromers of these polyethers have one polymerizable group; the prepolymers may have two or more polymerizable groups.

The preferred hydrophilic monomers of the present invention are DMA, NVP, HEMA, VMA, NVA, and mixtures thereof. Preferred hydrophilic monomers include mixtures of DMA and HEMA. Other suitable hydrophilic monomers will be apparent to one skilled in the art.

Generally, there are no particular restrictions with respect to the amount of the hydrophilic monomer present in the reactive monomer mixture. The amount of the hydrophilic monomers may be selected based upon the desired characteristics of the resulting hydrogel, including water content, clarity, wettability, protein uptake, and the like. Wettability may be measured by contact angle, and desirable contact angles are less than about 100°, less than about 80°, and less than about 60°. The hydrophilic monomer may be present in an amount in the range of, for instance, about 0.1 to about 100 weight percent, alternatively in the range of about 1 to about 80 weight percent, alternatively about 5 to about 65 weight percent, alternatively in the range of about 40 to about 60 weight percent, or alternatively about 55 to about 60 weight percent, based on the total weight of the reactive components in the reactive monomer mixture.

Silicone-Containing Components

Silicone-containing components suitable for use in the invention comprise one or more polymerizable compounds, where each compound independently comprises at least one polymerizable group, at least one siloxane group, and one or more linking groups connecting the polymerizable group(s) to the siloxane group(s). The silicone-containing components may, for instance, contain from 1 to 220 siloxane repeat units, such as the groups defined below. The silicone-containing component may also contain at least one fluorine atom.

The silicone-containing component may comprise: one or more polymerizable groups as defined above; one or more optionally repeating siloxane units; and one or more linking groups connecting the polymerizable groups to the siloxane units. The silicone-containing component may comprise: one or more polymerizable groups that are independently a (meth)acrylate, a styryl, a vinyl ether, a (meth)acrylamide, an N-vinyl lactam, an N-vinylamide, an 0-vinylcarbamate, an O-vinylcarbonate, a vinyl group, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, an N-vinyl lactam, an N-vinylamide, a styryl, or mixtures of the foregoing; one or more optionally repeating siloxane units; and one or more linking groups connecting the polymerizable groups to the siloxane units.

The silicone-containing component may comprise: one or more polymerizable groups that are independently a (meth)acrylate, a (meth)acrylamide, or mixtures of the foregoing; one or more optionally repeating siloxane units; and one or more linking groups connecting the polymerizable groups to the siloxane units.

The silicone-containing component may comprise one or more polymerizable compounds of Formula A:

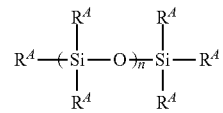

Formula A wherein:
at least one $R^A$ is a group of formula $R_g$-L- wherein $R_g$ is a polymerizable group and L is a linking group, and the remaining $R^A$ are each independently:
(a) $R_g$-L-,
(b) $C_1$-$C_{16}$ alkyl optionally substituted with one or more hydroxy, amino, amido, oxa, carboxy, alkyl carboxy, carbonyl, alkoxy, amido, carbamate, carbonate, halo, phenyl, benzyl, or combinations thereof, (c) $C_3$-$C_{12}$ cycloalkyl optionally substituted with one or more alkyl, hydroxy, amino, amido, oxa, carbonyl, alkoxy, amido, carbamate, carbonate, halo, phenyl, benzyl, or combinations thereof, (d) a $C_6$-$C_{14}$ aryl group optionally substituted with one or more alkyl, hydroxy, amino, amido, oxa, carboxy, alkyl carboxy, carbonyl, alkoxy, amido, carbamate, carbonate, halo, phenyl, benzyl, or combinations thereof, (e) halo, (f) alkoxy, cyclic alkoxy, or aryloxy, (g) siloxy, (h) alkyleneoxy-alkyl or alkoxy-alkyleneoxy-alkyl, such as polyethyleneoxyalkyl, polypropyleneoxyalkyl, or poly(ethyleneoxy-co-propyleneoxyalkyl), or (i) a monovalent siloxane chain comprising from 1 to 100 siloxane repeat units optionally substituted with alkyl, alkoxy, hydroxy, amino, oxa, carboxy, alkyl carboxy, alkoxy, amido, carbamate, halo or combinations thereof; and n is from 0 to 500 or from 0 to 200, or from 0 to 100, or from 0 to 20, where it is understood that when n is other than 0, n is a distribution having a mode equal to a stated value. When n is 2 or more, the SiO units may carry the same or different $R^A$ substituents and if different $R^A$ substituents are present, the n groups may be in random or block configuration.

In Formula A, three $R^A$ may each comprise a polymerizable group, alternatively two $R^A$ may each comprise a polymerizable group, or alternatively one $R^A$ may comprise a polymerizable group.

Examples of silicone-containing components suitable for use in the invention include, but are not limited to, compounds listed in Table B. Where the compounds in Table B contain polysiloxane groups, the number of SiO repeat units in such compounds, unless otherwise indicated, is preferably from 3 to 100, more preferably from 3 to 40, or still more preferably from 3 to 20.

TABLE B

| | |
|---|---|
| 1 | mono-methacryloxypropyl terminated mono-n-butyl terminated polydimethylsiloxanes (mPDMS) (preferably containing from 3 to 15 SiO repeating units) |
| 2 | mono-acryloxypropyl terminated mono-n-butyl terminated polydimethylsiloxane |
| 3 | mono(meth)acryloxypropyl terminated mono-n-methyl terminated polydimethylsiloxane |
| 4 | mono(meth)acryloxypropyl terminated mono-n-butyl terminated polydiethylsiloxane |
| 5 | mono(meth)acryloxypropyl terminated mono-n-methyl terminated polydiethylsiloxane |
| 6 | mono(meth)acrylamidoalkylpolydialkylsiloxanes |
| 7 | mono(meth)acryloxyalkyl terminated mono-alkyl polydiarylsiloxanes |
| 8 | 3-methacryloxypropyltris(trimethylsiloxy)silane (TRIS) |
| 9 | 3-methacryloxypropylbis(trimethylsiloxy)methylsilane |
| 10 | 3-methacryloxypropylpentamethyl disiloxane |
| 11 | mono(meth)acrylamidoalkylpolydialkylsiloxanes |
| 12 | mono(meth)acrylamidoalkyl polydimethylsiloxanes |
| 13 | N-(2,3-dihydroxypropane)-N'-(propyl tetra(dimethylsiloxy) dimethylbutylsilane)acrylamide |
| 14 | N-[3-tris(trimethylsiloxy)silyl]-propyl acrylamide (TRIS-Am) |
| 15 | 2-hydroxy-3-[3-methyl-3,3-di(trimethylsiloxy)silylpropoxy]-propyl methacrylate (SiMAA) |
| 16 | 2-hydroxy-3-methacryloxypropyloxypropyl-tris(trimethylsiloxy)silane |
| 17 | 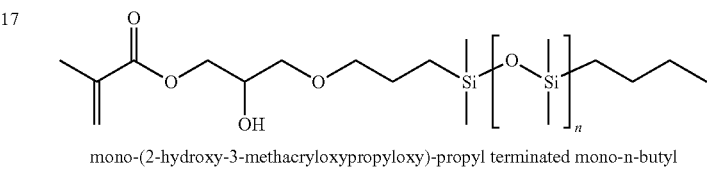 mono-(2-hydroxy-3-methacryloxypropyloxy)-propyl terminated mono-n-butyl terminated polydimethylsiloxanes (OH-mPDMS) (containing from 4 to 30, or from 4 to 20, or from 4 to 15 SiO repeat units) |
| 18 | 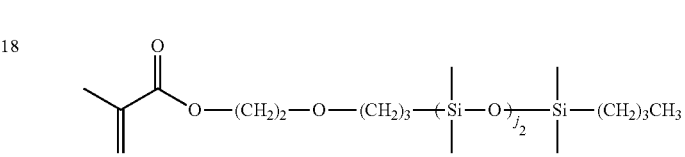 |
| 19 | 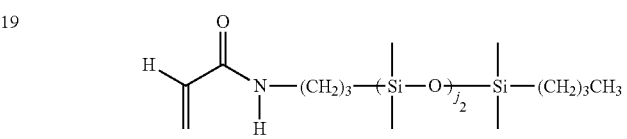 |

TABLE B-continued

20
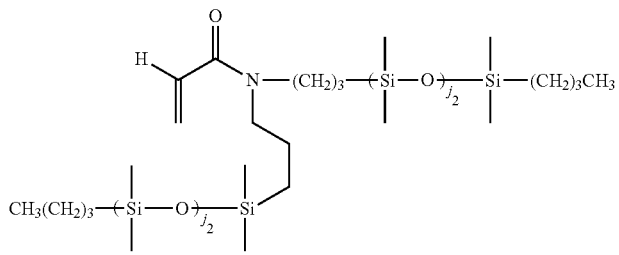

21
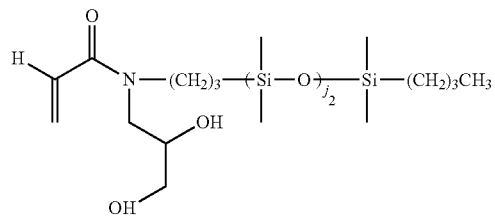

22
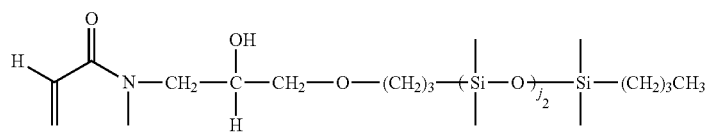

23
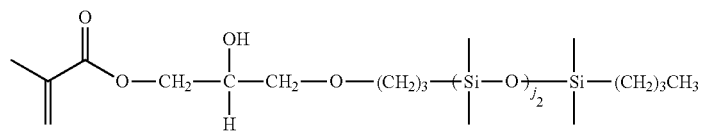

24
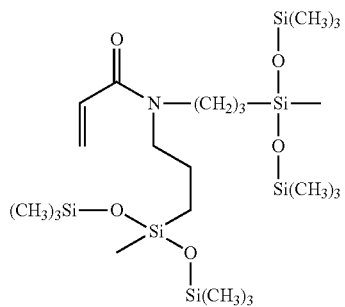

Additional non-limiting examples of suitable silicone-containing components are listed in Table C. Unless otherwise indicated, j2 where applicable is preferably from 1 to 100, more preferably from 3 to 40, or still more preferably from 3 to 15. In compounds containing j1 and j2, the sum of j1 and j2 is preferably from 2 to 100, more preferably from 3 to 40, or still more preferably from 3 to 15.

TABLE C

25
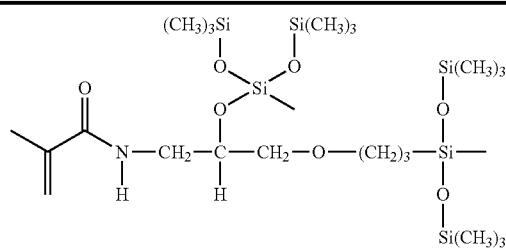

TABLE C-continued

| | |
|---|---|
| 26 | 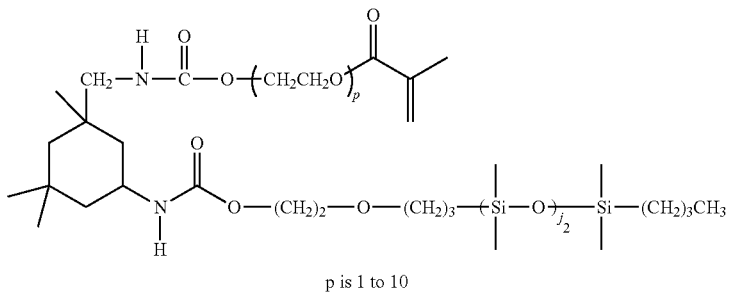<br>p is 1 to 10 |
| 27 | 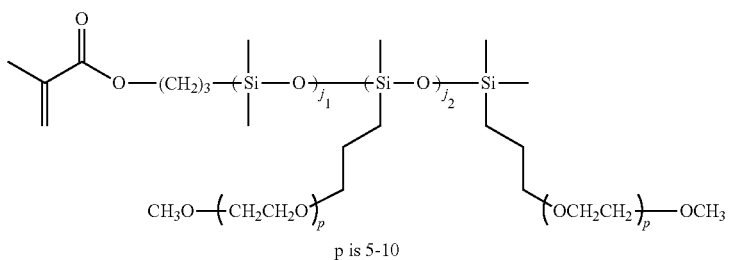<br>p is 5-10 |
| 28 | 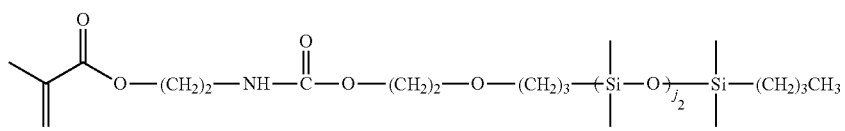 |
| 29 | 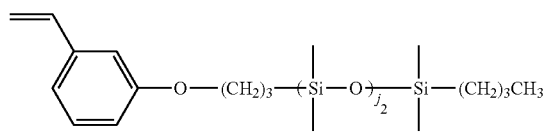 |
| 30 | 1,3-bis[4-(vinyloxycarbonyloxy)but-1-yl]tetramethyl-disiloxane |
| 31 | 3-(vinyloxycarbonylthio) propyl-[tris(trimethylsiloxy)silane] |
| 32 | 3-[tris(trimethylsiloxy)silyl] propyl allyl carbamate |
| 33 | 3-[tris(trimethylsiloxy)silyl] propyl vinyl carbamate |
| 34 | tris(trimethylsiloxy)silylstyrene (Styryl-TRIS) |
| 35 | 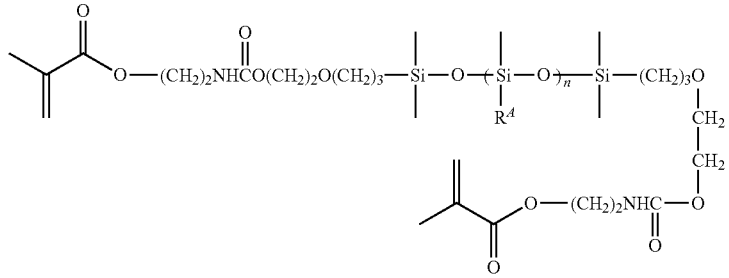<br>$R^A = CH_3$ (a) or $CH_2CH_2CF_3$ (b) or<br>$CH_2—(CH_2)_2—[OCH_2CH_2]_{1-10}—OCH_3$ (c);<br>a + b + c = n |
| 36 | 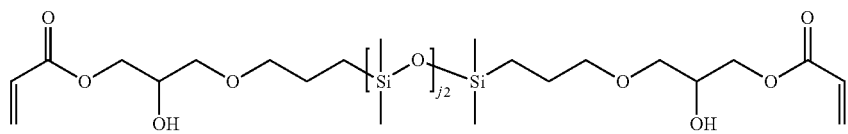 |
| 37 | 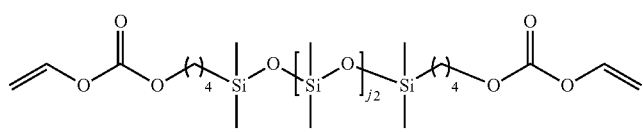 |

TABLE C-continued

38 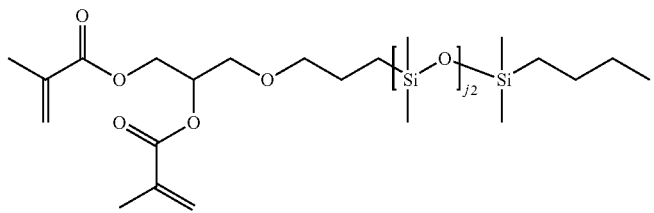

39 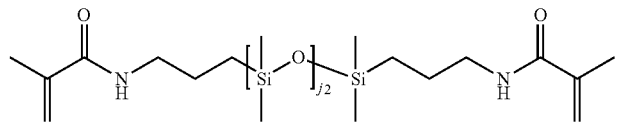

40 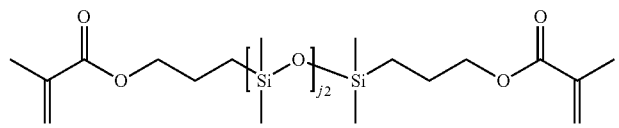

41 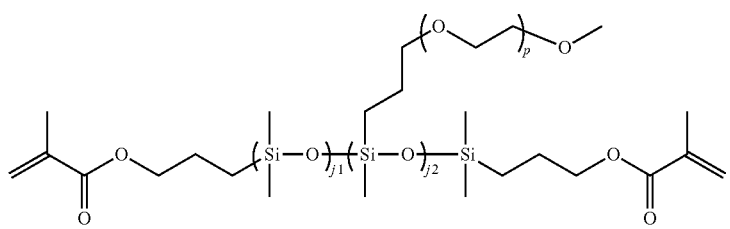

j1 = 80-90
j2 = 5-6
p = 7-8

42 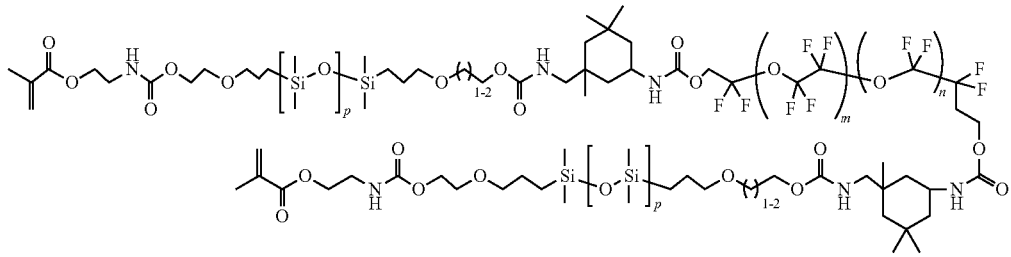

m = 3.5-5.5; n = 4-6.5; p = 22-26

43 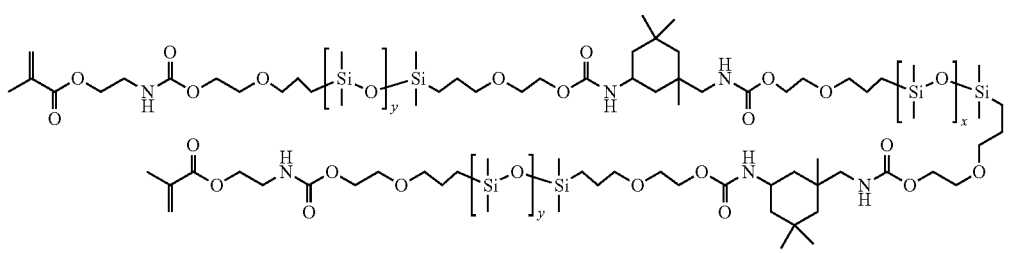

IEM-PDMS (Mn ≈ 3000)-IPDI-PDMS (Mn ≈ 2000)-IPDI-PDMS (Mn ≈ 3000)-IEM (see WO2016100457)

Mixtures of silicone-containing components may be used. By way of example, suitable mixtures may include, but are not limited to: a mixture of mono-(2-hydroxy-3-methacryloxypropyloxy)-propyl terminated mono-n-butyl terminated polydimethylsiloxane (OH-mPDMS) having different molecular weights, such as a mixture of OH-mPDMS containing 4 and 15 SiO repeat units; a mixture of OH-mPDMS with different molecular weights (e.g., containing 4 and 15 repeat SiO repeat units) together with a silicone based crosslinker, such as bis-3-acryloxy-2-hydroxypropyloxypropyl polydimethylsiloxane (ac-PDMS); a mixture of 2-hydroxy-3-[3-methyl-3,3-di(trimethylsiloxy)silylpropoxy]-propyl methacrylate (SiMAA) and mono-methacryloxypropyl terminated mono-n-butyl terminated polydimethylsiloxane (mPDMS), such as mPDMS 1000.

Silicone-containing components for use in the invention may have an average molecular weight of from about 400 to about 4000 daltons.

The silicone containing component(s) may be present in amounts up to about 95 weight %, or from about 10 to about 80 weight %, or from about 20 to about 70 weight %, based upon all reactive components of the reactive mixture (excluding diluents).

Polyamides

The reactive mixture may include at least one polyamide. As used herein, the term "polyamide" refers to polymers and copolymers comprising repeating units containing amide groups. The polyamide may comprise cyclic amide groups, acyclic amide groups and combinations thereof and may be any polyamide known to those of skill in the art. Acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formulae G1 and G2:

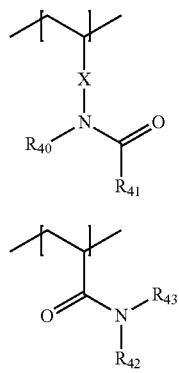

Formula G1

Formula G2 wherein X is a direct bond, —(CO)—, or —(CONHR$_{44}$)—, wherein R$_{44}$ is a C$_1$ to C$_3$ alkyl group; R$_{40}$ is selected from H, straight or branched, substituted or unsubstituted C$_1$ to C$_4$ alkyl groups; R$_{41}$ is selected from H, straight or branched, substituted or unsubstituted C$_1$ to C$_4$ alkyl groups, amino groups having up to two carbon atoms, amide groups having up to four carbon atoms, and alkoxy groups having up to two carbon groups; R$_{42}$ is selected from H, straight or branched, substituted or unsubstituted C$_1$ to C$_4$ alkyl groups; or methyl, ethoxy, hydroxyethyl, and hydroxymethyl; R$_{43}$ is selected from H, straight or branched, substituted or unsubstituted C$_1$ to C$_4$ alkyl groups; or methyl, ethoxy, hydroxyethyl, and hydroxymethyl; wherein the number of carbon atoms in R$_{40}$ and R$_{41}$ taken together is 8 or less, including 7, 6, 5, 4, 3, or less; and wherein the number of carbon atoms in R$_{42}$ and R$_{43}$ taken together is 8 or less, including 7, 6, 5, 4, 3, or less. The number of carbon atoms in R$_{40}$ and R$_{41}$ taken together may be 6 or less or 4 or less. The number of carbon atoms in R$_{42}$ and R$_{43}$ taken together may be 6 or less. As used herein substituted alkyl groups include alkyl groups substituted with an amine, amide, ether, hydroxyl, carbonyl or carboxy groups or combinations thereof.

R$_{40}$ and R$_{41}$ may be independently selected from H, substituted or unsubstituted C$_1$ to C$_2$ alkyl groups. X may be a direct bond, and R$_{40}$ and R$_{41}$ may be independently selected from H, substituted or unsubstituted C$_1$ to C$_2$ alkyl groups. R$_{42}$ and R$_{43}$ can be independently selected from H, substituted or unsubstituted C$_1$ to C$_2$ alkyl groups, methyl, ethoxy, hydroxyethyl, and hydroxymethyl.

The acyclic polyamides of the present invention may comprise a majority of the repeating units of Formula LV or Formula LVI, or the acyclic polyamides can comprise at least 50 mole percent of the repeating unit of Formula G or Formula G1, including at least 70 mole percent, and at least 80 mole percent. Specific examples of repeating units of Formula G and Formula G1 include repeating units derived from N-vinyl-N-methylacetamide, N-vinylacetamide, N-vinyl-N-methylpropionamide, N-vinyl-N-methyl-2-methylpropionamide, N-vinyl-2-methylpropionamide, N-vinyl-N,N'-dimethylurea, N,N-dimethylacrylamide, methacrylamide, and acyclic amides of Formulae G2 and G3:

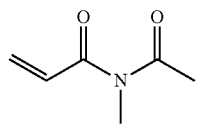

Formula G2

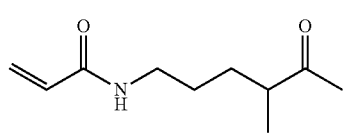

Formula G3

Examples of suitable cyclic amides that can be used to form the cyclic polyamides of include α-lactam, β-lactam, γ-lactam, δ-lactam, and ε-lactam. Examples of suitable cyclic polyamides include polymers and copolymers comprising repeating units of Formula G4:

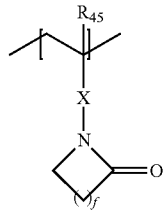

Formula G4 wherein R$_{45}$ is a hydrogen atom or methyl group; wherein f is a number from 1 to 10; wherein X is a direct bond, —(CO)—, or —(CONHR$_{46}$)—, wherein R$_{46}$ is a C$_1$ to C$_3$ alkyl group. In Formula LIX, f may be 8 or less, including 7, 6, 5, 4, 3, 2, or 1. In Formula G4, f may be 6 or less, including 5, 4, 3, 2, or 1. In Formula G4, f may be from 2 to 8, including 2, 3, 4, 5, 6, 7, or 8. In Formula LIX, f may be 2 or 3. When X is a direct bond, f may be 2. In such instances, the cyclic polyamide may be polyvinylpyrrolidone (PVP).

The cyclic polyamides of the present invention may comprise 50 mole percent or more of the repeating unit of Formula G4, or the cyclic polyamides can comprise at least 50 mole percent of the repeating unit of Formula G4, including at least 70 mole percent, and at least 80 mole percent.

The polyamides may also be copolymers comprising repeating units of both cyclic and acyclic amides. Additional repeating units may be formed from monomers selected from hydroxyalkyl(meth)acrylates, alkyl(meth)acrylates, other hydrophilic monomers and siloxane substituted (meth)acrylates. Any of the monomers listed as suitable hydrophilic monomers may be used as co-monomers to form the additional repeating units. Specific examples of additional monomers which may be used to form polyamides include 2-hydroxyethyl (meth)acrylate, vinyl acetate, acrylonitrile, hydroxypropyl (meth)acrylate, methyl (meth)acrylate and hydroxybutyl (meth)acrylate, dihydroxypropyl (meth)acrylate, polyethylene glycol mono(meth)acrylate, and the like and mixtures thereof. Ionic monomers may also be included. Examples of ionic monomers include (meth)acrylic acid, N-[(ethenyloxy)carbonyl]-O-alanine (VINAL, CAS #148969-96-4), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT, carboxybetaine; CAS 79704-35-1), 1-propanaminium, N,N-dimethyl-N-[3-[(1-oxo-2-propen-1-yl)amino]propyl]-3-sulfo-, inner salt (SBT, sulfobetaine, CAS 80293-60-3), 3,5-Dioxa-8-aza-4-phosphaundec-10-en-1-aminium, 4-hydroxy-N,N,N-trimethyl-9-oxo-, inner salt, 4-oxide (9CI) (PBT, phosphobetaine, CAS 163674-35-9, 2-methacryloyloxyethyl phosphorylcholine, 3-(dimethyl(4-vinylbenzyl)ammonio)propane-1-sulfonate (DMVBAPS), 3-((3-acrylamidopropyl) dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS).

The reactive monomer mixture may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof. The polyamide may be a mixture of PVP (e.g., PVP K90) and PVMA (e.g., having a Mw of about 570 KDa).

The total amount of all polyamides in the reactive mixture may be in the range of between 1 weight percent and about 35 weight percent, including in the range of about 1 weight percent to about 15 weight percent, and in the range of about 5 weight percent to about 15 weight percent, in all cases, based on the total weight of the reactive components of the reactive monomer mixture.

Without intending to be bound by theory, when used with a silicone hydrogel, the polyamide functions as an internal wetting agent. The polyamides of the present invention may be non-polymerizable, and in this case, are incorporated into the silicone hydrogels as semi-interpenetrating networks. The polyamides are entrapped or physically retained within the silicone hydrogels. Alternatively, the polyamides of the present invention may be polymerizable, for example as polyamide macromers or prepolymers, and in this case, are covalently incorporated into the silicone hydrogels. Mixtures of polymerizable and non-polymerizable polyamides may also be used.

When the polyamides are incorporated into the reactive monomer mixture they may have a weight average molecular weight of at least 100,000 daltons; greater than about 150,000; between about 150,000 to about 2,000,000 daltons; between about 300,000 to about 1,800,000 daltons. Higher molecular weight polyamides may be used if they are compatible with the reactive monomer mixture.

Cross-Linking Agents

It is generally desirable to add one or more cross-linking agents, also referred to as cross-linking monomers, multifunctional macromers, and prepolymers, to the reactive mixture. The cross-linking agents may be selected from bifunctional crosslinkers, trifunctional crosslinkers, tetrafunctional crosslinkers, and mixtures thereof, including silicone-containing and non-silicone containing cross-linking agents. Non-silicone-containing cross-linking agents include ethylene glycol dimethacrylate (EGDMA), tetraethylene glycol dimethacrylate (TEGDMA), trimethylolpropane trimethacrylate (TMPTMA), triallyl cyanurate (TAC), glycerol trimethacrylate, methacryloxyethyl vinylcarbonate (HEMAVc), allylmethacrylate, methylene bisacrylamide (MBA), and polyethylene glycol dimethacrylate wherein the polyethylene glycol has a molecular weight up to about 5000 Daltons. The cross-linking agents are used in the usual amounts, e.g., from about 0.000415 to about 0.0156 mole per 100 grams of reactive Formulas in the reactive mixture. Alternatively, if the hydrophilic monomers and/or the silicone-containing components are multifunctional by molecular design or because of impurities, the addition of a cross-linking agent to the reactive mixture is optional. Examples of hydrophilic monomers and macromers which can act as the cross-linking agents and when present do not require the addition of an additional cross-linking agent to the reactive mixture include (meth)acrylate and (meth)acrylamide end-capped polyethers. Other cross-linking agents will be known to one skilled in the art and may be used to make the silicone hydrogel of the present invention.

It may be desirable to select crosslinking agents with similar reactivity to one or more of the other reactive components in the formulation. In some cases, it may be desirable to select a mixture of crosslinking agents with different reactivity in order to control some physical, mechanical or biological property of the resulting silicone hydrogel. The structure and morphology of the silicone hydrogel may also be influenced by the diluent(s) and cure conditions used.

Multifunctional silicone-containing components, including macromers, cross-linking agents, and prepolymers, may also be included to further increase the modulus and retain tensile strength. The silicone containing cross-linking agents may be used alone or in combination with other cross-linking agents. An example of a silicone containing component which can act as a cross-linking agent and, when present, does not require the addition of a crosslinking monomer to the reactive mixture includes α, ω-bismethacryloxypropyl polydimethylsiloxane. Another example is bis-3-acryloxy-2-hydroxypropyloxypropyl polydimethylsiloxane (ac-PDMS).

Cross-linking agents that have rigid chemical structures and polymerizable groups that undergo free radical polymerization may also be used. Non-limiting examples of suitable rigid structures include cross-linking agents comprising phenyl and benzyl ring, such are 1,4-phenylene diacrylate, 1,4-phenylene dimethacrylate, 2,2-bis(4-methacryloxyphenyl)-propane, 2,2-bis[4-(2-acryloxyethoxy)phenyl]propane, 2,2-bis[4-(2-hydroxy-3-methacryloxypropoxy)-phenyl]propane, and 4-vinylbenzyl methacrylate, and combinations thereof. Rigid crosslinking agents may be included in amounts between about 0.5 and about 15, or 2-10, 3-7 based upon the total weight of all of the reactive components. The physical and mechanical properties of the silicone hydrogels of the present invention may be optimized for a particular use by adjusting the components in the reactive mixture.

Non-limiting examples of silicone cross-linking agents also include the multi-functional silicone-containing components described in Table D above.

Further Constituents

The reactive mixture may contain additional components such as, but not limited to, diluents, initiators, UV absorbers, visible light absorbers, photochromic compounds, pharmaceuticals, nutraceuticals, antimicrobial substances, tints, pigments, copolymerizable dyes, nonpolymerizable dyes, release agents, and combinations thereof.

Classes of suitable diluents for silicone hydrogel reactive mixtures include alcohols having 2 to 20 carbon atoms, amides having 10 to 20 carbon atoms derived from primary amines and carboxylic acids having 8 to 20 carbon atoms. The diluents may be primary, secondary, and tertiary alcohols.

Generally, the reactive components are mixed in a diluent to form a reactive mixture. Suitable diluents are known in the art. For silicone hydrogels, suitable diluents are disclosed in WO 03/022321 and U.S. Pat. No. 6,020,445, the disclosure of which is incorporated herein by reference. Classes of suitable diluents for silicone hydrogel reactive mixtures include alcohols having 2 to 20 carbons, amides having 10 to 20 carbon atoms derived from primary amines, and carboxylic acids having 8 to 20 carbon atoms. Primary and tertiary alcohols may be used. Preferred classes include alcohols having 5 to 20 carbons and carboxylic acids having 10 to 20 carbon atoms. Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)-propylbis(trimethylsiloxy) methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino) ethanol mixtures thereof and the like. Examples of amide diluents include N,N-dimethyl propionamide and dimethyl acetamide.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like. If a diluent is present, generally there are no particular restrictions with respect to the amount of diluent present. When diluent is used, the diluent may be present in an amount in the range of about 2 to about 70 weight percent, including in the range of about 5 to about 50 weight percent, and in the range of about 15 to about 40 weight percent, based on the total weight of the reactive mixtures (including reactive and nonreactive Formulas). Mixtures of diluents may be used.

A polymerization initiator may be used in the reactive mixture. The polymerization initiator may include, for instance, at least one of lauroyl peroxide, benzoyl peroxide, iso-propyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphine oxide (Irgacure 819), 2,4,6-trimethylbenzyldiphenyl phosphine oxide and 2,4,6-trimethylbenzoyl diphenylphosphine oxide, benzoin methyl ester and a combination of cam-phorquinone and ethyl 4-(N,N-dimethylamino)benzoate.

Commercially available (from IGM Resins B.V., The Netherlands) visible light initiator systems include Irgacure® 819, Irgacure® 1700, Irgacure® 1800, Irgacure® 819, Irgacure® 1850 and Lucrin® TPO initiator. Commercially available (from IGM Resins B.V.) UV photoinitiators include Darocur® 1173 and Darocur® 2959. These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998. The initiator is used in the reactive mixture in effective amounts to initiate photopolymerization of the reactive mixture, e.g., from about 0.1 to about 2 parts by weight per 100 parts of reactive monomer mixture. Polymerization of the reactive mixture can be initiated using the appropriate choice of heat or visible or ultraviolet light or other means depending on the polymerization initiator used. Alternatively, initiation can be conducted using e-beam without a photoinitiator. However, when a photoinitiator is used, the preferred initiators are bisacylphosphine oxides, such as bis(2,4,6-tri-methylbenzoyl)-phenyl phosphine oxide (Irgacure® 819) or a combination of 1-hydroxycyclohexyl phenyl ketone and bis(2,6-dimethoxybenzoyl)-2,4-4-trimethylpentyl phosphine oxide (DMBAPO).

The reactive mixture for making the ophthalmic devices of the invention may comprise, in addition to an invention compound, any of the polymerizable compounds and optional components described above.

The reactive mixture may comprise: an invention compound, such as a compound of formula I, II, or III, and a hydrophilic component.

The reactive mixture may comprise: an invention compound, such as a compound of formula I, II, or III, and a hydrophilic component selected from DMA, NVP, HEMA, VMA, NVA, methacrylic acid, and mixtures thereof. Preferred are mixtures of HEMA and methacrylic acid.

The reactive mixture may comprise: an invention compound, such as a compound of formula I, II, or III, a hydrophilic component, and a silicone-containing component.

The reactive mixture may comprise: an invention compound, such as a compound of formula I, II, or III, a hydrophilic component selected from DMA, HEMA and mixtures thereof; a silicone-containing component selected from 2-hydroxy-3-[3-methyl-3,3-di(trimethylsiloxy)silylpropoxy]-propyl methacrylate (SiMAA), mono-methacryloxypropyl terminated mono-n-butyl terminated polydimethylsiloxane (mPDMS), mono-(2-hydroxy-3-methacryloxypropyl)-propyl ether terminated mono-n-butyl terminated polydimethylsiloxane (OH-mPDMS), and mixtures thereof; and a wetting agent (preferably PVP or PVMA). For the hydrophilic component, mixtures of DMA and HEMA are preferred. For the silicone containing component, mixtures of SiMAA and mPDMS are preferred.

The reactive mixture may comprise: an invention compound, such as a compound of formula I, II, or III, a hydrophilic component comprising a mixture of DMA and HEMA; a silicone-containing component comprising a mixture of OH-mPDMS having from 2 to 20 repeat units (preferably a mixture of 4 and 15 repeat units). Preferably, the reactive mixture further comprises a silicone-containing crosslinker, such as ac-PDMS. Also preferably, the reactive mixture contains a wetting agent (preferably DMA, PVP, PVMA or mixtures thereof).

The reactive mixture may comprise: an invention compound, such as a compound of formula I, II, or III; between about 1 and about 15 wt % at least one polyamide (e.g., an acyclic polyamide, a cyclic polyamide, or mixtures thereof); at least one first mono-functional, hydroxyl substituted poly(disubstituted siloxane) having 4 to 8 siloxane repeating units (e.g., OH-mPDMS where n is 4 to 8, preferably n is 4); at least one second hydroxyl substituted poly(disubstituted siloxane) that is a mono-functional hydroxyl substituted poly(disubstituted siloxane)s having 10 to 200 or 10-100 or 10-50 or 10-20 siloxane repeating units (e.g., OH-mPDMS where n is 10 to 200 or 10-100 or 10-50 or 10-20, preferably n is 15); about 5 to about 35 wt % of at least one hydrophilic monomer; and optionally a multifunctional hydroxyl substituted poly(disubstituted siloxane)s having 10 to 200, or 10 to 100 siloxane repeating units (e.g., ac-PDMS). Preferably, the first mono-functional, hydroxyl substituted poly(disubstituted siloxane) and the second hydroxyl substituted poly(disubstituted siloxane) are present in concentrations to provide a ratio of weight percent of the first mono-functional, hydroxyl substituted poly(disubstituted siloxane) to weight percent of the second hydroxyl substituted poly(disubstituted siloxane) of 0.4-1.3, or 0.4-1.0.

The reactive mixture may comprise: an invention compound, such as a compound of formula I, II, or III, a hydrophilic component such as DMA; a silicone-containing component such as compound 8 in Table B ((TRIS), and a silicone macromer, such as compound 42 in Table C.

The reactive mixture may comprise: an invention compound, such as a compound of formula I, II, or III, a hydrophilic component such as DMA and/or NVP; a silicone-containing component such as compound 14 in Table B ((TRIS-Am), and a silicone macromer, such as compound 43 in Table C (IEM-PDMS-IPDI-PDMS-IPDI-PDMS-IEM).

The reactive mixture may comprise: an invention compound, such as a compound of formula I, II, or III, a hydrophilic component such as VMA; and a silicone macromer, such as compound 35 in Table C.

The reactive mixture may comprise: an invention compound, such as a compound of formula I, II, or III, a hydrophilic component such as VMA and/or NVP; a silicone-containing component such as compound 28 in Table C (e.g., where j2 is about 16), a silicone macromer, such as compound 35 in Table C.

The reactive mixture may comprise: an invention compound, such as a compound of formula I, II, or III, a hydrophilic component such as VMA and/or NVP; a silicone-containing component such as a compound 18 in Table B (e.g., where j2 is about 4), a silicone macromer, such as a compound 41 in Table C.

The foregoing reactive mixtures may contain optional ingredients such as, but not limited to, one or more initiators, internal wetting agents, crosslinkers, other UV or HEV absorbers, and diluents. Moreover, the ophthalmic devices made from the foregoing reactive mixtures may undergo further treatment including, but not limited to, plasma treatment, application of a coating (such as in-package coatings (IPCs) as described in U.S. Pat. No. 8,480,227), and the like.

Curing of Hydrogels and Manufacture of Lens

The reactive mixtures may be formed by any of the methods known in the art, such as shaking or stirring, and used to form polymeric articles or devices by known methods. The reactive components are mixed together either with or without a diluent to form the reactive mixture.

For example, ophthalmic devices may be prepared by mixing reactive components, and, optionally, diluent(s), with a polymerization initiator and curing by appropriate conditions to form a product that can be subsequently formed into the appropriate shape by lathing, cutting, and the like. Alternatively, the reactive mixture may be placed in a mold and subsequently cured into the appropriate article.

A method of making a molded ophthalmic device, such as a silicone hydrogel contact lens, may comprise: preparing a reactive monomer mixture; transferring the reactive monomer mixture onto a first mold; placing a second mold on top the first mold filled with the reactive monomer mixture; and curing the reactive monomer mixture by free radical copolymerization to form the silicone hydrogel in the shape of a contact lens.

The reactive mixture may be cured via any known process for molding the reactive mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The contact lenses of this invention may be formed by the direct molding of the silicone hydrogels, which is economical, and enables precise control over the final shape of the hydrated lens. For this method, the reactive mixture is placed in a mold having the shape of the final desired silicone hydrogel and the reactive mixture is subjected to conditions whereby the monomers polymerize, thereby producing a polymer in the approximate shape of the final desired product.

After curing, the lens may be subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. The aqueous solutions of the present invention may comprise at least about 20 weight percent water, or at least about 50 weight percent water, or at least about 70 weight percent water, or at least about 95 weight percent water. Aqueous solutions may also include additional water soluble Formulas such as inorganic salts or release agents, wetting agents, slip agents, pharmaceutical and nutraceutical Formulas, combinations thereof and the like. Release agents are compounds or mixtures of compounds which, when combined with water, decrease the time required to release a contact lens from a mold, as compared to the time required to release such a lens using an aqueous solution that does not comprise the release agent. The aqueous solutions may not require special handling, such as purification, recycling or special disposal procedures.

Extraction may be accomplished, for example, via immersion of the lens in an aqueous solution or exposing the lens to a flow of an aqueous solution. Extraction may also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leaching or extraction aid in the aqueous solution to a level sufficient to facilitate adequate removal of unreacted components from the lens. The foregoing may be conducted in batch or continuous processes, with or without the addition of heat, agitation or both.

Application of physical agitation may be desired to facilitate leach and release. For example, the lens mold part to which a lens is adhered can be vibrated or caused to move back and forth within an aqueous solution. Other methods may include ultrasonic waves through the aqueous solution.

The lenses may be sterilized by known means such as, but not limited to, autoclaving.

As indicated above, preferred ophthalmic devices are contact lenses, more preferably soft hydrogel contact lenses. The transmission wavelengths and percentages described herein may be measured on various thicknesses of lenses using, for instance, the methodologies described in the Examples. By way of example, a preferred center thickness for measuring transmission spectra in a soft contact lens may be from 80 to 100 microns, or from 90 to 100 microns or from 90 to 95 microns. Typically, the measurement may be made at the center of the lens using, for instance, a 4 nm instrument slit width.

Silicone hydrogel ophthalmic devices (e.g., contact lenses) according to the invention preferably exhibit the following properties. All values are prefaced by "about," and the devices may have any combination of the listed properties. The properties may be determined by methods known to those skilled in the art, for instance as described in United States pre-grant publication US20180037690, which is incorporated herein by reference.

Water concentration %: at least 20%, or at least 25% and up to 80% or up to 70%

Haze: 30% or less, or 10% or less

Advancing dynamic contact angle (Wilhelmy plate method): 100° or less, or 80° or less; or 50° or less Tensile Modulus (psi): 120 or less, or 80 to 120

Oxygen permeability (Dk, barrers): at least 80, or at least 100, or at least 150, or at least 200

Elongation to Break: at least 100

For ionic silicon hydrogels, the following properties may also be preferred (in addition to those recited above):

Lysozyme uptake (µg/lens): at least 100, or at least 150, or at least 500, or at least 700

Polyquaternium 1 (PQ1) uptake (%): 15 or less, or 10 or less, or 5 or less

Compounds of the invention may be used with other products, in addition to ophthalmic devices. For instance, the compounds may be used in windows (e.g., vehicle or building windows), or optical equipment, such as binoculars and cameras, and the like. In such use, the compounds may, for instance, be coated on the surface of the device. To facilitate coating, the compound may be dissolved in a solvent.

Some embodiments of the invention will now be described in detail in the following Examples.

EXAMPLES

Test Methods

Ultraviolet-visible spectra of compounds in solution were measured on a Perkin Elmer Lambda 45 or an Agilent Cary 6000i UV-VIS scanning spectrometer. The instrument was thermally equilibrated for at least thirty minutes prior to use. For the Perkin Elmer instrument, the scan range was 200-800 nm; the scan speed was 960 nm per minute; the slit width was 4 nm; the mode was set on transmission or absorbance; and baseline correction was selected. For the Cary instrument, the scan range was 200-800 nm; the scan speed was 600 nm/min; the slit width was 2 nm; the mode was transmission or absorbance; and baseline correction was selected. A baseline correction was performed before samples were analyzed using the autozero function.

Ultraviolet-visible spectra of contact lenses formed in part from the claimed compositions were measured on a Perkin Elmer Lambda 45 UV-VIS or an Agilent Cary 6000i UV-VIS scanning spectrometer using packing solution. The instrument was thermally equilibrated for at least thirty minutes prior to use. For the Perkin Elmer instrument, the scan range was 200-800 nm; the scan speed was 960 nm per minute; the slit width was 4 nm; the mode was set on transmission; and baseline correction was selected. Baseline correction was performed using cuvettes containing plastic two-piece lens holders and the same solvents. These two-piece contact lens holders were designed to hold the sample in the quartz cuvette in the location through which the incident light beam traverses. The reference cuvette also contained a two-piece holder. To ensure that the thickness of the samples is constant, all lenses were made using identical molds. The center thickness of the contact lens was measured using an electronic thickness gauge. Reported center thickness and percent transmission spectra are obtained by averaging three individual lens data.

It is important to ensure that the outside surfaces of the cuvette are completely clean and dry and that no air bubbles are present in the cuvette. Repeatability of the measurement is improved when the reference cuvette and its lens holder remain constant and when all samples use the same sample cuvette and its lens holder, making sure that both cuvettes are properly inserted into the instrument.

The following abbreviations will be used throughout the Examples and Figures and have the following meanings:

DMA: N, N-dimethylacrylamide (Jarchem)
HEMA: 2-hydroxyethyl methacrylate (Bimax)
PVP K90: poly(N-vinylpyrrolidone) (ISP Ashland)
TEGDMA: tetraethylene glycol dimethacrylate (Esstech)
Omnirad 819: bis(2,4,6-trimethylbenzoyl)-phenylphosphineoxide (IGM Resins)
mPDMS: mono-n-butyl terminated monomethacryloxypropyl terminated polydimethylsiloxane ($M_n$=800-1500 grams/mole) (Gelest)
SiMAA: 2-propenoic acid, 2-methyl-2-hydroxy-3-[3-[1,3,3,3-tetramethyl-1-[(trimethylsilyl)oxy]disiloxanyl]propoxy] propyl ester (Toray) or 3-(3-(1,1,1,3,5,5,5-heptamethyltrisiloxan-3-yl)propoxy)-2-hydroxypropyl methacrylate
D3O: 3,7-dimethyl-3-octanol (Vigon)
DIW: deionized water
Borate Buffered Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2-liter volumetric flask.
BC: back or base curve plastic mold
FC: front curve plastic mold
PP: polypropylene which is the homopolymer of propylene
TT: Tuftec which is a hydrogenated styrene butadiene block copolymer (Asahi Kasei Chemicals)
Z: Zeonor which is a polycycloolefin thermoplastic polymer (Nippon Zeon Co Ltd)
LED: light emitting diode
NMR: proton nuclear magnetic resonance spectroscopy
UV-VIS: ultraviolet-visible spectroscopy TLC: thin layer chromatography
L: liter
mL: milliliter
mM: millimolar
kg: kilogram
g: gram
mol: mole
mmol: millimole
min: minute(s)
nm: nanometer(s)
Abs: absorption
% T: Percent Transmission
Example 1—Synthesis of Iron (II) Bis[2-(4-([2,2':6',2''-terpyridin]-4'-yl)phenoxy)ethyl acrylate] hexafluorophosphate [Compound (C)] as shown in Scheme 2
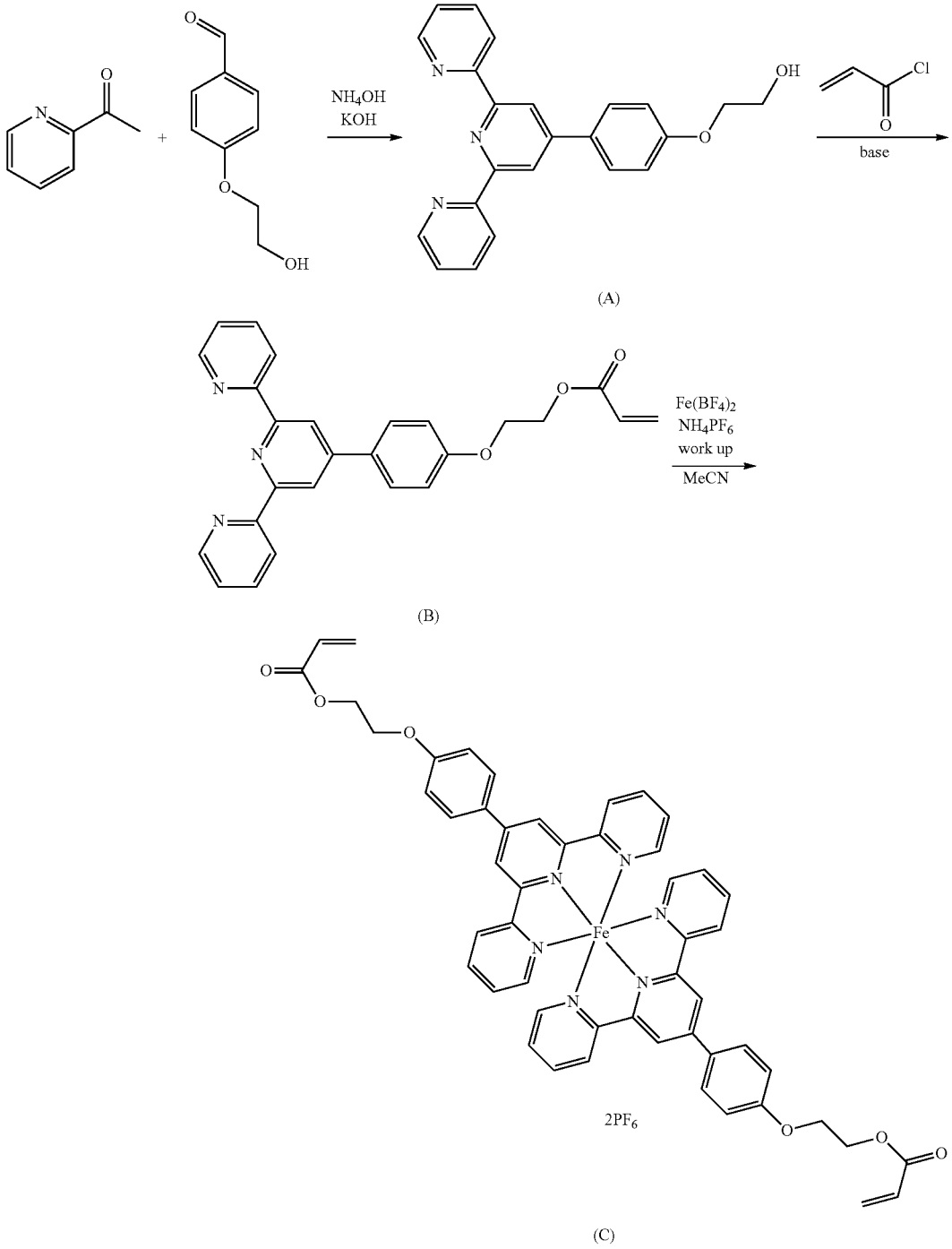

Synthesis of 2-(4-([2,2':6',2"-terpyridin]-4'-yl)phenoxy)ethan-1-ol [Compound (A)]

Sequentially added 2-acetylpyridine (0.06 mol), 240 mL of a 15 weight percent aqueous potassium hydroxide (KOH) solution (w/w), and concentrated ammonium hydroxide (NH$_4$OH) (0.40 mol), and 4-(2-hydroxyethoxy)benzaldehyde (0.03 mol) to a 3-neck round bottom flask charged with a stir bar and equipped with a reflux condenser with nitrogen gas inlet. The reaction mixture was heated to reflux for 15 hours. After reaction completion, as indicated by TLC, the reaction mixture was cooled to room temperature and filtered through a glass fritted funnel. The collected solids were washed with water followed by ethyl acetate, giving an off-white solid in 49% yield. $^1$H NMR (DMSO-d$_6$, 500 MHz): δ 3.76 (2H, br s, ArCH$_2$CH$_2$OH), 4.08 (2H, br s, ArCH$_2$CH$_2$OH), 4.96 (1H, br s, ArCH$_2$CH$_2$OH), 7.14 (2H, br s, pyridyl), 7.52 (2H, br s, pyridyl), 7.88 (2H, br s, pyridyl), 8.02 (2H, br s, pyridyl), 8.66 (4H, br s, phenyl), 8.75 (2H, br s, pyridyl).

Synthesis of 2-(4-([2,2':6',2"-terpyridin]-4'-yl)phenoxy)ethyl acrylate [Compound (B)]

Sequentially added Compound (A) (5.4 mmol), triethylamine (6.5 mmol), and 50 mL of dichloromethane to a 3-neck round bottom flask charged with a stir bar and equipped with a reflux condenser with nitrogen gas inlet. Using a syringe, acryloyl chloride (6.5 mmol) was slowly added to the reaction mixture. Upon completing the addition of the acid chloride, the reaction mixture turned dark blue to grey. After allowing the reaction mixture to stir at room temperature for at least 12 hours, the solvent was removed under reduced pressure. The resulting residue was extracted with warm toluene (3×100 mL). The organics were combined and volatiles were removed under vacuum to give a red-yellow solid in 24% yield. $^1$H NMR (CDCl$_3$, 500 MHz): δ 4.28 (2H, t, J=4.5 Hz, ArCH$_2$CH$_2$OH), 4.55 (2H, t, J=4.5 Hz, ArCH$_2$CH$_2$OH), 5.87 (1H, dd, J=1.5, 10.5 Hz, vinylic), 6.19 (1H, dd, J=10.5, 17.5 Hz, vinylic), 6.47 (1H, dd, J=1.5, 17.5 Hz, vinylic), 7.04 (2H, dt, J=2.0, 8.5 Hz, pyridyl or phenyl), 7.34-7.36 (2H, m, pyridyl or phenyl), 7.86-7.89 (4H, m, pyridyl or phenyl), 8.65 (2H, dt, J=1.0, 8.5 Hz, pyridyl or phenyl), 8.683 (2H, s, pyridyl or phenyl), 8.73-7.75 (2H, m, pyridyl or phenyl).

Synthesis of iron (II) bis[2-(4-([2,2':6',2"-terpyridin]-4'-yl)phenoxy)ethyl acrylate]hexafluorophosphate [Compound (C)]

Added a concentrated solution of iron (II) tetrafluoroborate hexahydrate (1.28 mmol) in methanol to a concentrated solution of Compound (B) (0.62 mmol) in dichloromethane causing the solution mixture color to turn deep violet. The reaction mixture was allowed to stir at room temperature for about 18 hours. Volatiles were removed under reduced vacuum giving a violet residue. The residue was dissolved in minimal amounts of acetonitrile. Slow addition of the violet iron solution to a saturated aqueous solution of ammonium hexafluorophosphate resulted in the formation of a violet precipitate. The reaction mixture was filtered using a glass fritted filter to give a violet solid in a quantitative yield. $^1$H NMR (acetone-d$_6$, 500 MHz): δ 4.56 (4H, br d, ArCH$_2$CH$_2$OH), 5.98 (1H, br s, vinylic), 6.26 (1H, br s, vinylic), 6.44 (1H, br s, vinylic), 7.24 (2H, s, pyridyl or phenyl), 7.38 (2H, s, pyridyl or phenyl), 7.55 (2H, s, pyridyl or phenyl), 8.04 (2H, s, pyridyl or phenyl), 8.46 (2H, s, pyridyl or phenyl), 8.99 (2H, s, pyridyl or phenyl), 9.57 (2H, s, pyridyl or phenyl). The UV-VIS spectrum of Compound (C) is shown in FIG. 1.

Example 2—Preparation of Contact Lenses

A reactive monomer mixture (RMM) was prepared composed of 77 weight percent of the formulation listed in Table 1 and 23 weight percent of the diluent D30. The RMM was filtered through a 0.3 μm filter using a stainless-steel under pressure. The RMM was degassed at ambient temperature by applying static vacuum (650 mm Hg) for 30 minutes. Then, in a glove box with a nitrogen gas atmosphere and less than about 0.1-0.2 percent oxygen gas, about 75 μL of the reactive mixture were dosed using an Eppendorf pipet at room temperature into the FC made of 90:10 (w/w) Zeonor/TT blend. The BC made of 90:10 (w/w) Z:TT blend was then placed onto the FC. The molds were equilibrated for a minimum of twelve hours in the glove box prior to dosing. Pallets containing eight mold assemblies each were transferred into an adjacent glove box maintained at 65° C., and the lenses were cured from the top and the bottom for 20 minutes using 435 nm LED lights having an intensity of about 2 mW/cm$^2$ at the tray's location.

TABLE 1

Component List

| Component | Ex 2 (weight percent) |
| --- | --- |
| mPDMS | 31.00 |
| SiMAA | 28.00 |
| DMA | 24.88 |
| HEMA | 6.89 |
| TEGDMA | 1.50 |
| PVP K90 | 7.00 |
| Omnirad 819 | 0.48 |
| Compound (C) | 0.25 |
| Σ Components | 100 |

The lenses were manually de-molded with most lenses adhering to the FC and released by suspending the lenses in about one liter of 70 percent IPA for about one hour, followed by soaking two more times with fresh 70 percent IPA for 30 minutes; then two times with fresh DIW for 15 minutes. The lenses were equilibrated and stored in DIW. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The average center thickness of each lens set was measured; Ex. 2=100 microns.

FIG. 2 shows the UV-VIS spectrum of the Ex. 2 lenses having broad absorption in the ultraviolet region as well as a band centered at 570 nm.

We claim:

1. An ophthalmic device that is a polymerization reaction product of a reactive mixture comprising:
a monomer suitable for making the ophthalmic device; and a compound of formula:

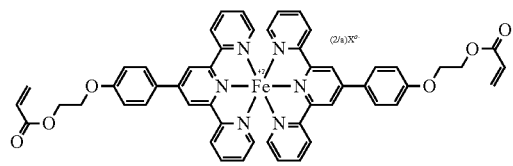

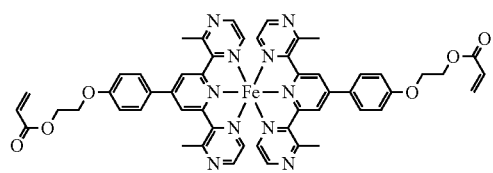

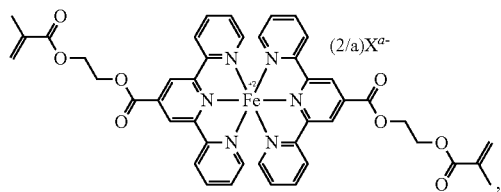

or

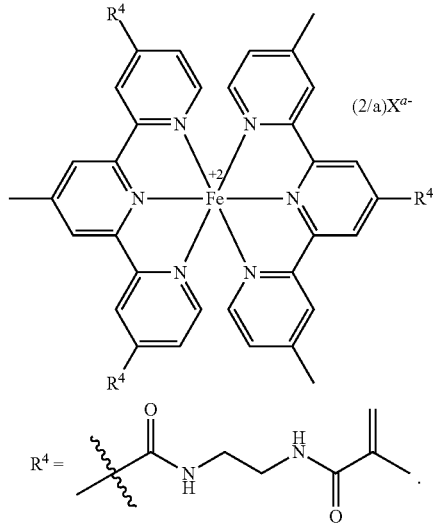

$R^4 =$ 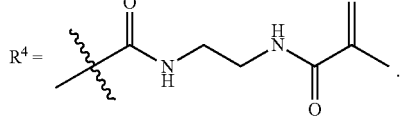

2. The ophthalmic device of claim 1 wherein a is 1 and X is $PF_6$.

3. The ophthalmic device of claim 1 having a visible light absorption maximum between 500 and 625 nm.

4. The ophthalmic device of claim 1 that is a contact lens or an intraocular lens.

5. The ophthalmic device of claim 1 that is a contact lens and wherein the monomer comprises a mixture of a hydrophilic component and a silicone-containing component.

* * * * *